US010078926B2

(12) United States Patent
Sugishita et al.

(10) Patent No.: US 10,078,926 B2
(45) Date of Patent: Sep. 18, 2018

(54) MANAGEMENT APPARATUS, MANAGEMENT METHOD, AND NON-TRANSITORY COMPUTER-READABLE RECORDING MEDIUM STORING MANAGEMENT PROGRAM

(71) Applicant: Panasonic Intellectual Property Management Co., Ltd., Osaka (JP)

(72) Inventors: Yoshihiro Sugishita, Osaka (JP); Akihiro Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/479,126

(22) Filed: Apr. 4, 2017

(65) Prior Publication Data

US 2017/0301161 A1 Oct. 19, 2017

(30) Foreign Application Priority Data

Apr. 15, 2016 (JP) .................................. 2016-081741
Dec. 13, 2016 (JP) .................................. 2016-241567

(51) Int. Cl.
*G07C 9/00* (2006.01)
*G06K 7/10* (2006.01)
(Continued)

(52) U.S. Cl.
CPC ......... *G07C 9/00087* (2013.01); *G06F 21/00* (2013.01); *G06F 21/32* (2013.01);
(Continued)

(58) Field of Classification Search
CPC ...... G07C 9/00087; G07C 2009/00095; G06K 7/10861; G06K 7/1417; G06K 19/06037;
(Continued)

(56) References Cited

U.S. PATENT DOCUMENTS

2006/0217995 A1* 9/2006 Sagnak .................. G06Q 10/06
235/385
2009/0006169 A1* 1/2009 Wetzer ............... G06Q 10/0631
705/7.14
(Continued)

FOREIGN PATENT DOCUMENTS

JP 2009-032032 2/2009
JP 2013-003863 1/2013

*Primary Examiner* — Kristy A Haupt
(74) *Attorney, Agent, or Firm* — Greenblum & Bernstein, P.L.C.

(57) ABSTRACT

A method includes obtaining, from a first device, first device identification information for identifying the first device; storing, in a memory, operation instruction information including second device identification information for identifying a second device to be inspected and operation record information including a result of inspection of the second device, the operation record information being created at a time of inspection of the second device; and making the operation record information stored in the memory editable in a case where the obtained first device identification information and the second device identification information included in the operation instruction information match each other.

9 Claims, 18 Drawing Sheets

(51) Int. Cl.
*G06K 7/14* (2006.01)
*G06K 19/06* (2006.01)
*G06F 21/00* (2013.01)
*G06F 21/32* (2013.01)
*H04L 29/06* (2006.01)
*H04W 88/02* (2009.01)
*G06Q 10/06* (2012.01)

(52) U.S. Cl.
CPC ....... *G06K 7/10861* (2013.01); *G06K 7/1417* (2013.01); *G06K 19/06037* (2013.01); *G06Q 10/06311* (2013.01); *G07C 2009/00095* (2013.01); *H04L 63/0853* (2013.01); *H04L 63/0861* (2013.01); *H04L 63/0876* (2013.01); *H04W 88/02* (2013.01)

(58) Field of Classification Search
CPC .... G06F 21/00; H04L 63/0861; H04W 88/02; G06Q 10/20
See application file for complete search history.

(56) References Cited

U.S. PATENT DOCUMENTS

2013/0311646 A1\* 11/2013 Nikaido ................ G06Q 10/20 709/224
2017/0262817 A1\* 9/2017 Mihara ................ G06K 7/1417

\* cited by examiner

FIG. 7

| DEVICE NUMBER | DEVICE NAME | OPERATION TIMING | OPERATION AREA | WORKER RESPONSIBLE | DETERMINATION RESULT | OPERATION STATUS |
|---|---|---|---|---|---|---|
| ABC-0001 | GAS SEPARATOR | JANUARY 20, 2020 | A-B1 | A | NO PROBLEM | COMPLETED |
| ABC-0002 | GAS SEPARATOR | JANUARY 20, 2020 | A-B1 | A | COPED WITH | COMPLETED |
| ABC-0004 | GAS SEPARATOR | JANUARY 20, 2020 | A-BC | A | | NOT STARTED |
| XYZ-0101 | GAS DRUM | JANUARY 20, 2020 | A-B2 | A | | NOT STARTED |
| XYZ-0112 | SUMP DRUM | JANUARY 20, 2020 | A-B3 | A | | NOT STARTED |
| 123-4567 | VACUUM STRIPPER | JANUARY 20, 2020 | A-BA | A | | NOT STARTED |
| .. | .. | .. | .. | .. | .. | .. |

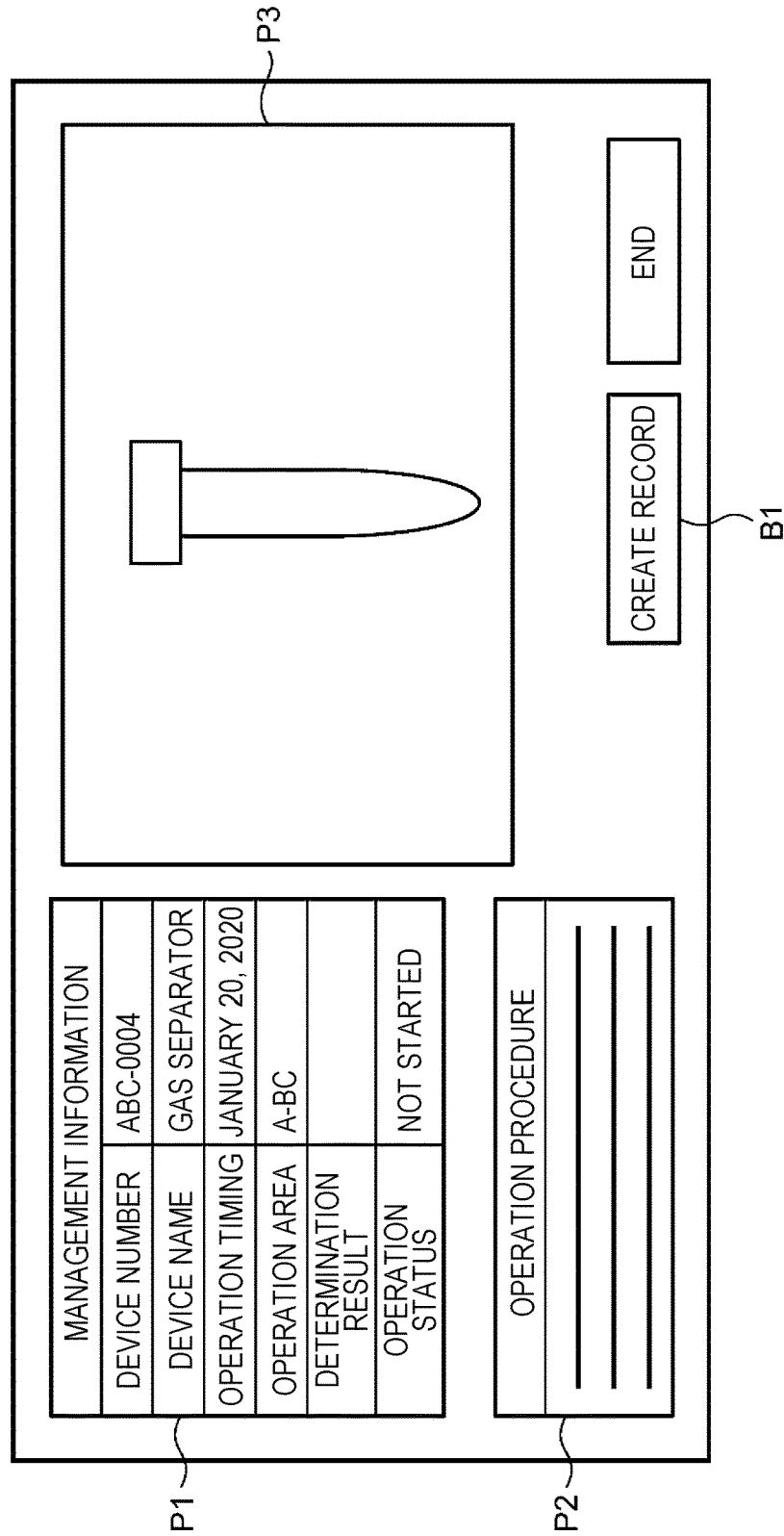

MANAGEMENT APPARATUS, MANAGEMENT METHOD, AND NON-TRANSITORY COMPUTER-READABLE RECORDING MEDIUM STORING MANAGEMENT PROGRAM

BACKGROUND

1. Technical Field

The present disclosure relates to a management apparatus, a management method, and a non-transitory computer-readable recording medium storing a management program for managing operation record information created at the time of inspection of a plurality of devices. For example, the present disclosure relates to operation record creation at the time of inspection of a plurality of devices (including equipment) at a factory, a plant facility, a construction site, or the like.

2. Description of the Related Art

In recent years, aging of a lot of devices (including equipment) can be seen at factories, plant facilities, construction sites, and the like. Furthermore, the number of workers responsible for maintenance and safety management with a high level of knowledge is decreasing. Moreover, the importance of inspection of devices as a safety measure is increasing.

In view of such circumstances, attempts to make device inspection efficient have been considered. As a recent attempt to make inspection efficient, a person responsible for inspection checks computerized drawings of devices and operation procedures on site by using a mobile terminal.

However, factories, plant facilities, construction sites, and the like in which numerous devices are placed are faced with inspection errors, oversight of abnormalities, and the like in spite of importance of inspection.

The greatest cause of inspection errors and oversight of abnormalities is false recognition of a device to be inspected. In many cases, devices having similar shapes are scattered at a factory, a plant facility, a construction site, or the like. For this reason, a person responsible for inspection mistakenly inspects a wrong device placed close to a device to be inspected and fails to inspect the device to be inspected. This leads to oversight of abnormalities.

Although a device to be inspected is given a name and a device number, the name and the device number are similar to those of other devices. A person responsible with false recognition of information mistakenly inspects a wrong device close to the device to be inspected and fails to inspect the device to be inspected. This leads to oversight of abnormalities.

Furthermore, a person responsible for inspection sometimes makes a false report by using a past operation record as a current operation record without inspecting a device to be inspected in spite of a command to inspect the device. This also leads to oversight of abnormalities.

In view of such problems, Japanese Patent No. 4832376 discloses a technique of authenticating workers by using biological information and allowing only permitted workers to operate a device. According to Japanese Patent No. 4832376, this makes it possible to authenticate a worker in response to worker's operation request in real-time control while taking into consideration operation authority at the time of disaster, inspection, and maintenance in a supervision and control system such as a plant.

Japanese Patent No. 5579663 discloses a technique of determining whether or not a device is a device to be inspected by using identification information extracted from a display plate that is provided on the device or close to the device and displays device information and by using positional information of an on-site operator of the device and displaying a result of determination in a control room. According to Japanese Patent No. 5579663, this makes it possible to prevent an erroneous operation caused by a human judgment error.

However, the conventional configurations do not consider anything about how to manage operation record information created at the time of inspection of a device and need further improvements.

SUMMARY

One non-limiting and exemplary embodiment provides a management apparatus, a management method, and a recording medium storing a management program that make it possible to prevent a worker from creating operation record information on the basis of false recognition of a device to be inspected and to prevent a worker from creating false operation record information without visiting a device to be inspected by guaranteeing worker's visit to the device to be inspected.

In one general aspect, the techniques disclosed here feature an apparatus including: an obtainer that obtains, from a first device, first device identification information for identifying the first device; a memory in which operation instruction information including second device identification information for identifying a second device to be inspected and operation record information including a result of inspection of the second device, the operation record information being created at a time of inspection of the second device; and first circuitry which, in operation, performs first operations including making the operation record information stored in the memory editable in a case where the first device identification information obtained from the first device and the second device identification information included in the operation instruction information match each other.

According to the present disclosure, it is possible to prevent a worker from creating operation record information on the basis of false recognition of a device to be inspected and to prevent a worker from creating false operation record information without visiting a device to be inspected by guaranteeing worker's visit to the device to be inspected.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 7 is a diagram illustrating an example of a management information list screen displayed on a display unit of the device management apparatus illustrated in FIG. 4;

FIG. 8 is a diagram illustrating an example of an operation instruction information screen displayed on the display unit of the device management apparatus illustrated in FIG. 4;

DETAILED DESCRIPTION

Figure 1:
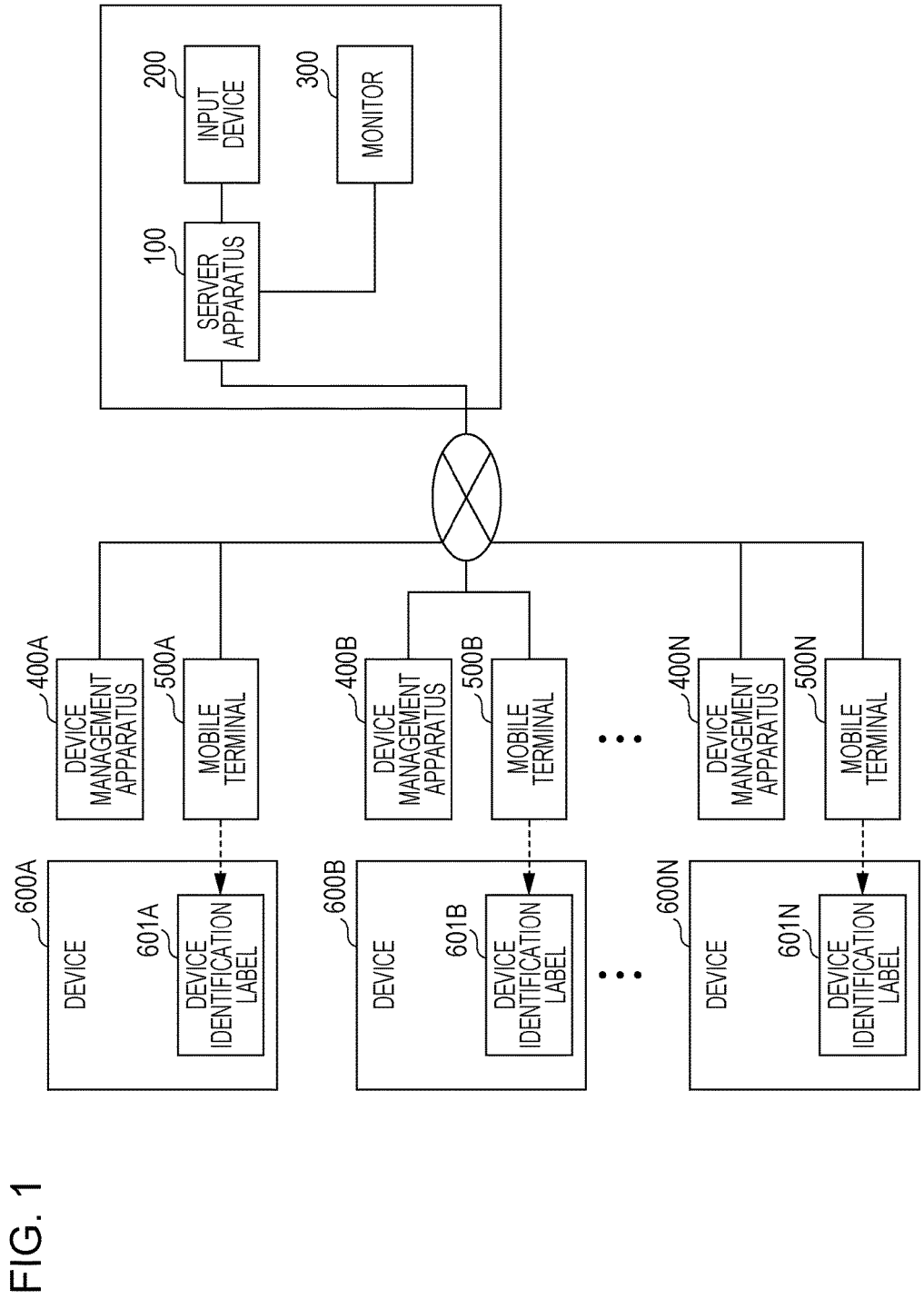
FIG. 1 is a diagram schematically illustrating an example of an overall configuration of a device inspection system according to Embodiment 1 of the present disclosure.

Underlying Knowledge Forming Basis of the Present Disclosure

According to Japanese Patent No. 4832376, only workers permitted by authentication using workers' biological information are allowed to operate a device. This restricts workers who operate the device, thereby preventing a worker who is not responsible for operation of the device from taking a flexible action such as stopping the device in case of emergency. According to Japanese Patent No. 5579663, in which positional information of an on-site device operator is used, it is impossible to determine that a device is a device to be inspected by using the positional information of an on-site device operator and identification information extracted from the display plate in a case where the operator removes part of the device to be inspected, brings the removed part to another place, and inspect the part at the place. As a result, it is impossible to inspect the device to be inspected.

Furthermore, according to the conventional configurations, a worker can create a false report without inspecting a device on site. It is therefore impossible to guarantee that the worker has inspected the device at the site.

In order to solve such problems, an apparatus according to an aspect of the present disclosure includes: an obtainer that obtains, from a first device, first device identification information for identifying the first device; a memory in which operation instruction information including second device identification information for identifying a second device to be inspected and operation record information including a result of inspection of the second device, the operation record information being created at a time of inspection of the second device; and first circuitry which, in operation, performs first operations including making the operation record information stored in the memory editable in a case where the first device identification information obtained from the first device and the second device identification information included in the operation instruction information match each other.

According to the configuration, first device identification information for identifying the first device is obtained from the first device, and operation record information stored in the memory is made editable in a case where the first device identification information obtained from the first device and the second device identification information included in the operation instruction information match each other. This makes it possible to prevent a worker from falsely recognizing the device to be inspected and creating operation record information of a wrong device when inspecting a plurality of devices (including equipment) placed at a factory, a plant facility, a construction site, or the like and to prevent the worker from creating false operation record information without visiting the device to be inspected by guaranteeing worker's visit to the device to be inspected.

Furthermore, a worker who inspects the device is not limited to a specific person. This allows a worker who is not responsible for inspection of the device to take flexible actions such as inspecting the device in case of emergency. Furthermore, a worker is given editing power that makes the operation record information editable while guaranteeing worker's visit to the device to be inspected. This allows the worker to edit the operation record information even in a case where the worker removes part of the device, moves to another place, and inspects the removed part at the place.

The apparatus may be configured to further include a mobile terminal including the obtainer; and a device management apparatus including the memory and the first circuitry and being separate from the mobile terminal, the obtainer including: a reader that reads, from the first device, a device identification label having an image that expresses the first device identification information and is unique to the first device, the mobile terminal further including: second circuitry which, in operation, performs second operations including specifying the first device identification information corresponding to the read device identification label, and a transmitter that transmits the specified first device identification information to the device management apparatus, the device management apparatus further including a receiver that receives the transmitted first device identification information, the first operations further including making the operation record information stored in the memory editable in a case where the received first device identification information and the second device identification information included in the operation instruction information match each other.

According to the configuration, the apparatus is constituted by a mobile terminal and a device management apparatus that is separate from the mobile terminal. The mobile terminal reads, from the first device, a device identification label having an image that expresses the first device identification information and is unique to the first device, specifies the first device identification information corresponding to the read device identification label, and then transmits the specified first device identification information to the device management apparatus. The device management apparatus receives the first device identification information transmitted from the mobile terminal and makes the operation record information stored in the memory editable in a case where the received first device identification information and the second device identification information included in the operation instruction information match each other This allows a worker and another worker (e.g., an administrator) to independently use the mobile terminal and the device management apparatus, in addition to the above effect. For example, a worker who uses the mobile terminal may inspect the device, and another worker who uses the device management apparatus may edit the operation record information on the basis of a result of inspection of the device by the worker.

The apparatus may be configured such that the reader reads the device identification label and an individual identification label concurrently, the individual identification label being carried by a first worker and having an image that expresses first individual identification information for identifying the first worker and is unique to the first worker; the operation instruction information further includes second individual identification information for identifying a second worker responsible for inspection of the second device; the second operations further includes specifying the first individual identification information corresponding to the read individual identification label; the transmitter further transmits the specified first individual identification information to the device management apparatus; the receiver further receives the transmitted first individual identification information; and the first operations further includes making the operation record information editable in a case where the received first device identification information and the second device identification information included in the operation instruction information match each other and where the received first individual identification information and the second individual identification information included in the operation instruction information match each other.

According to the configuration, an individual identification label is carried by a first worker and has an image that expresses first individual identification information for identifying the first worker and is unique to the first worker, and the operation instruction information further includes second individual identification information for identifying a second worker responsible for inspection of the second device. The mobile terminal reads the device identification label and the individual identification label concurrently, further specifies the first individual identification information corresponding to the read individual identification label, and then further transmits the specified first individual identification information to the device management apparatus. The device management apparatus further receives the transmitted first individual identification information and makes the operation record information editable in a case where the received first device identification information and the second device identification information included in the operation instruction information match each other and where the received first individual identification information and the second individual identification information included in the operation instruction information match each other.

Since not only matching of the first device identification information and the second device identification information, but also matching of the first individual identification information and the second individual identification information are checked, it is possible to prevent, with certainty, a worker from falsely recognizing the device to be inspected and creating operation record information of a wrong device when inspecting a plurality of devices (including equipment) placed at a factory, a plant facility, a construction site, or the like and to prevent, with certainty, the worker from creating false operation record information without visiting the device to be inspected while guaranteeing worker's visit to the device to be inspected.

The apparatus may be configured such that the reader reads the device identification label and an individual identification label separately, the individual identification label being carried by a first worker and having an image that expresses first individual identification information for identifying the first worker and is unique to the first worker; the operation instruction information further includes second individual identification information for identifying a second worker responsible for inspection of the second device; the second operations further includes specifying the first individual identification information corresponding to the read individual identification label, the transmitter further transmits the specified first individual identification information to the device management apparatus; the receiver further receives the transmitted first individual identification information; and the first operations further includes making the operation record information editable in a case where an interval between a timing at which the device identification label is read by the reader and a timing at which the individual identification label is read by the reader is within a predetermined period, the received first device identification information and the second device identification information included in the operation instruction information match each other, and the received first individual identification information and the second individual identification information included in the operation instruction information match each other.

According to the configuration, an individual identification label is carried by a first worker and has an image that expresses first individual identification information for identifying the first worker and is unique to the first worker, and the operation instruction information further includes second individual identification information for identifying a second worker responsible for inspection of the second device. The mobile terminal reads the device identification label and the individual identification label separately, further specifies the first individual identification information corresponding to the read individual identification label, and then further transmits the specified first individual identification information to the device management apparatus. The device management apparatus further receives the transmitted first individual identification information and makes the operation record information editable in a case where an interval between a timing at which the device identification label is read by the reader and a timing at which the individual identification label is read by the reader is within a predetermined period, the received first device identification information and the second device identification information included in the operation instruction information match each other, and the received first individual identification information and the second individual identification information included in the operation instruction information match each other.

Since not only matching of the first device identification information and the second device identification information, but also matching of the first individual identification information and the second individual identification information are checked only in a case where the interval between a timing at which the device identification label is read by the reader and a timing at which the individual identification label is read by the reader is within the predetermined period, it is possible to prevent, with certainty, a worker from falsely recognizing the device to be inspected and creating operation record information of a wrong device when inspecting a plurality of devices (including equipment) placed at a factory, a plant facility, a construction site, or the like and to prevent, with certainty, the worker from creating false operation record information without visiting the device to be inspected while guaranteeing worker's visit to the device to be inspected, even in a case where the device identification label and the individual identification label carried by the worker are separately read.

The apparatus may be configured such that the second operations further includes registering first individual identification information for identifying a first worker using the mobile terminal; the operation instruction information further includes second individual identification information for identifying a second worker responsible for inspection of the second device; the transmitter further transmits the registered first individual identification information to the device management apparatus; the receiver further receives the transmitted first individual identification information; and the first operations further includes making the operation record information editable in a case where the received first device identification information and the second device identification information included in the operation instruction information match each other and where the received first individual identification information and the second individual identification information included in the operation instruction information match each other.

According to the configuration, the second operations further includes registering first individual identification information for identifying a first worker using the mobile terminal, and the operation instruction information further includes second individual identification information for identifying a second worker responsible for inspection of the second device. The mobile terminal further transmits the registered first individual identification information to the device management apparatus. The device management apparatus further receives the transmitted first individual identification information and makes the operation record information editable in a case where the received first device identification information and the second device identification information included in the operation instruction information match each other and where the received first individual identification information and the second individual identification information included in the operation instruction information match each other.

Since not only matching of the first device identification information and the second device identification information, but also matching of the first individual identification information and the second individual identification information are checked, it is possible to prevent, with certainty, a worker from falsely recognizing the device to be inspected and creating operation record information of a wrong device when inspecting a plurality of devices (including equipment) placed at a factory, a plant facility, a construction site, or the like and to prevent, with certainty, the worker from creating false operation record information without visiting the device to be inspected while guaranteeing worker's visit to the device to be inspected. Furthermore, since the individual identification information of the worker is registered in advance in the mobile terminal, an individual identification label having a unique image that expresses individual identification information of the worker is unnecessary. This makes it possible to simplify the configuration of the apparatus and processing.

The apparatus may be configured such that the first device includes a display that displays the device identification label and an individual identification label, the individual identification label having an image that expresses first individual identification information for identifying a first worker and is unique to the first worker; the reader concurrently reads the device identification label displayed on the display and the individual identification label displayed on the display; the operation instruction information further includes second individual identification information for identifying a worker responsible for inspection of the second device; the second operations further includes specifying the first individual identification information corresponding to the read individual identification label; the transmitter further transmits the specified first individual identification information to the device management apparatus; the receiver further receives the transmitted first individual identification information; and the first operations further includes making the operation record information editable in a case where the received first device identification information and the second device identification information included in the operation instruction information match each other and where the received first individual identification information and the second individual identification information included in the operation instruction information match each other.

According to the configuration, the first device includes a display that displays the device identification label and an individual identification label, the individual identification label having an image that expresses first individual identification information for identifying a first worker and is unique to the first worker, and the operation instruction information further includes second individual identification information for identifying a worker responsible for inspection of the second device. The mobile terminal concurrently reads the device identification label displayed on the display and the individual identification label displayed on the display, further specifies the first individual identification information corresponding to the read individual identification label, and further transmits the specified first individual identification information to the device management apparatus. The device management apparatus further receives the transmitted first individual identification information and makes the operation record information editable in a case where the received first device identification information and the second device identification information included in the operation instruction information match each other and where the received first individual identification information and the second individual identification information included in the operation instruction information match each other.

Since not only matching of the first device identification information and the second device identification information, but also matching of the first individual identification information and the second individual identification information are checked by using the device identification label and the individual identification label displayed on the display of the first device, it is possible to prevent, with more certainty, a worker from falsely recognizing the device to be inspected and creating operation record information of a wrong device when inspecting a plurality of devices (including equipment) placed at a factory, a plant facility, a construction site, or the like and to prevent, with more certainty, the worker from creating false operation record information without visiting the device to be inspected by guaranteeing worker's visit to the device to be inspected.

The apparatus may be configured such that the first device includes a display that displays the device identification label and an individual identification label, the individual identification label having an image that expresses first individual identification information for identifying a first worker and is unique to the first worker; the reader separately reads the device identification label displayed on the display and the individual identification label displayed on the display; the operation instruction information further includes second individual identification information for identifying a worker responsible for inspection of the second device; the second operations further includes specifying the first individual identification information corresponding to the read individual identification label; the transmitter further transmits the specified first individual identification information to the device management apparatus; the receiver further receives the transmitted first individual identification information; and the first operations further includes making the operation record information editable in a case where an interval between a timing at which the device identification label is read by the reader and a timing at which the individual identification label is read by the reader is within a predetermined period, the received first device identification information and the second device identification information included in the operation instruction information match each other, and the received first individual identification information and the second individual identification information included in the operation instruction information match each other.

According to the configuration, the first device includes a display that displays the device identification label and an individual identification label, the individual identification label having an image that expresses first individual identification information for identifying a first worker and is unique to the first worker, and the operation instruction information further includes second individual identification information for identifying a worker responsible for inspection of the second device. The mobile terminal separately reads the device identification label displayed on the display and the individual identification label displayed on the display, further specifies the first individual identification information corresponding to the read individual identification label and further transmits the specified first individual identification information to the device management apparatus. The device management apparatus further receives the transmitted first individual identification information and makes the operation record information editable in a case where an interval between a timing at which the device identification label is read by the reader and a timing at which the individual identification label is read by the reader is within a predetermined period, the received first device identification information and the second device identification information included in the operation instruction information match each other, and the received first individual identification information and the second individual identification information included in the operation instruction information match each other.

Since not only matching of the first device identification information and the second device identification information, but also matching of the first individual identification information and the second individual identification information are checked only in a case where the interval between a timing at which the device identification label is read by the reader and a timing at which the individual identification label is read by the reader is within the predetermined period, it is possible to prevent, with certainty, a worker from falsely recognizing the device to be inspected and creating operation record information of a wrong device when inspecting a plurality of devices (including equipment) placed at a factory, a plant facility, a construction site, or the like and to prevent, with certainty, the worker from creating false operation record information without visiting the device to be inspected by guaranteeing worker's visit to the device to be inspected, even in a case where the displayed device identification label and the displayed individual identification label are separately read.

The apparatus may be configured such that the operation instruction information further includes inspection order information; a plurality of second devices are inspected in an order indicated by the inspection order information, each of the plurality of second devices being the second device; and the first operations further includes presenting the second device identification information to the mobile terminal in a case where the received first device identification information does not match the second device identification information of the second device to be inspected next according to the order indicated by the inspection order information.

According to the configuration, the operation instruction information further includes inspection order information, a plurality of second devices are inspected in an order indicated by the inspection order information, each of the plurality of second devices being the second device, and the first operations further includes presenting the second device identification information to the mobile terminal in a case where the received first device identification information does not match the second device identification information of the second device to be inspected next according to the order indicated by the inspection order information. This allows the worker who inspects a plurality of devices (including equipment) placed at a factory, a plant facility, a construction site, or the like to inspect devices in a correct inspection order even in a case where the worker falsely recognizes the inspection order of the devices.

The present disclosure can be realized not only as a management apparatus having the above characteristic features, but also as a management method and the like that perform characteristic processes corresponding to the characteristic features of the management apparatus. Furthermore, the present disclosure can also be realized as a recording medium storing a computer program that causes the computer to perform the characteristic processes included in such a management method. Therefore, similar effects to those produced by the management apparatus can be obtained also in the following other aspects.

A method according to another aspect of the present disclosure includes obtaining, from a first device, first device identification information for identifying the first device; storing, in a memory, operation instruction information including second device identification information for identifying a second device to be inspected and operation record information including a result of inspection of the second device, the operation record information being created at a time of inspection of the second device; and making the operation record information stored in the memory editable in a case where the obtained first device identification information and the second device identification information included in the operation instruction information match each other.

A non-transitory computer-readable recording medium according to another aspect of the present disclosure is a non-transitory computer-readable recording medium storing a program which, when executed by a computer, causes the computer to perform processes including: obtaining, from a first device, first device identification information for identifying the first device; storing, in a memory, operation instruction information including second device identification information for identifying a second device to be inspected and operation record information including a result of inspection of the second device, the operation record information being created at a time of inspection of the second device; and making the operation record information stored in the memory editable in a case where the obtained first device identification information and the second device identification information included in the operation instruction information match each other.

Needless to say, such a computer program can be made available over a non-transitory computer-readable recording medium such as a CD-ROM or a communication network such as the Internet.

The present disclosure may also be realized as a system in which some constituent elements of the management apparatus and other constituent elements of the management apparatus are distributed in a plurality of computers.

Embodiments of the present disclosure are described below with reference to the drawings.

Each of the embodiments described below illustrates a specific example of the present disclosure. Numerical values, shapes, constituent elements, steps, order of steps, and the like in the embodiments below are merely examples and do not limit the present disclosure. Among constituent elements in the embodiments below, constituent elements that are not described in independent claims indicating the highest concepts are described as optional constituent elements. Features in the embodiments below can be combined.

Embodiment 1

FIG. 1 is a diagram schematically illustrating an example of an overall configuration of a device inspection system according to Embodiment 1 of the present disclosure. In FIG. 1, the device inspection system includes a server apparatus 100, an input device 200, a monitor 300, a plurality of device management apparatuses 400A through 400N (hereinafter also referred to as "device management apparatus 400"), and a plurality of mobile terminals 500A through 500N (hereinafter also referred to as "mobile terminal 500").

The server apparatus 100, the input device 200, and the monitor 300 are placed at headquarters of a factory, a plant facility, a construction site, or the like. The device management apparatuses 400A through 400N and the mobile terminals 500A through 500N are used by workers at inspection sites where a plurality of devices 600A through 600N (hereinafter also referred to as "device 600") are placed. For example, a worker inspects the device 600A by using the device management apparatus 400A and the mobile terminal 500A.

The plurality of devices 600A through 600N have device identification labels 601A through 601N (hereinafter also referred to as "device identification label 601") having images that express device identification information for identifying the respective devices and are unique to the respective devices, respectively. For example, the device identification label 601A is fixed at a predetermined position on a front face of the device 600A so that the mobile terminal 500A used by the worker can take an image of the device identification label 601A.

The server apparatus 100, the device management apparatuses 400A through 400N, and the mobile terminals 500A through 500N are communicably connected to one another over a network. The network is a wireless network or a wired network. The wireless network is, for example, a wireless local area network (LAN), a wireless wide area network (WAN), the 3rd generation mobile communication system (3G), long term evolution (LTE), or wireless gigabit (Wi-Gig). The wired network is, for example, an intranet or the Internet.

The server apparatus 100 at the headquarters manages information such as information on the device 600A through 600N to be inspected, operation instruction information, operation record information, information on the device management apparatuses 400A through 400N, and information on the mobile terminals 500A through 500N. To give an instruction to inspect the devices 600A through 600N from the headquarters, operation instruction information is registered in the server apparatus 100. The operation instruction information may include, for example, at least device numbers of the devices 600A through 600N as device identification information for identifying the devices 600A through 600N and may include, as other kinds of information, for example, device names, operation timings, operation areas, person(s) responsible, and past operation results. These kinds of information are examples, and the operation instruction information is not limited to these kinds of information.

The device numbers included in the operation instruction information indicate unique device identification (ID) information allocated to the respective devices 600A through 600N. The device names are any names given to the respective devices 600A through 600N. The operation timings are scheduled date and time of inspection of the devices 600A through 600N or date and time of the last inspection of the devices 600A through 600N. The operation areas are, for example, area information indicative of positions of the respective devices 600A through 600N at a location such as a factory, a plant facility, or a construction site or positional information of the respective devices 600A through 600N obtained by a global positioning system (GPS). The person(s) responsible is(are) a worker responsible for inspection of the devices 600A through 600N or a worker group made up of a plurality of workers responsible for inspection of the devices 600A through 600N. The operation results indicate determination results and operation statuses concerning inspection of the devices 600A through 600N and may be blank in a case where the operation instruction information has been issued but no operation has been performed. The operation statuses are statuses indicating, for example, whether the operations have been completed or have not been initiated.

As the input device 200, for example, a mouse, a keyboard, a touch panel, or a touch pad is used. The input device 200 supplies a signal corresponding to a worker's input operation to the server apparatus 100 and to the mobile terminals 500A through 500N via the server apparatus 100. In a case where a microphone is used as the input device 200, the input operation to the server apparatus 100 can be performed by voice, and an operation instruction can be given by issuing a voice notification to the mobile terminals 500A through 500N.

As the monitor 300, for example, a liquid crystal display (LCD) or an organic electro luminescence (EL) display is used. The monitor 300 displays, for example, operation information of inspection of the devices 600A through 600N managed by the server apparatus 100, video information and device information transmitted from the device management apparatuses 400A through 400N and the mobile terminals 500A through 500N, and worker statuses.

The device management apparatuses 400A through 400N are used by workers on site, a leader who gives an operation instruction, and a worker responsible for creation of an operation record to create operation record information of the devices 600A through 600N or to refer to information on the devices 600A through 600N. The device management apparatuses 400A through 400N are sometimes used in a place other than an inspection site. An operation record can also be created by inputting, at a remote place, a result of inspection by a worker on site.

The mobile terminals 500A through 500N are terminals for inspection that are carried by workers on site and have a camera function.

In a case where a worker on site creates operation record information on site by himself or herself in addition to inspection, for example, the device management apparatus 400 and the mobile terminal 500 may be provided as a single mobile terminal apparatus (management apparatus).

Figure 2:
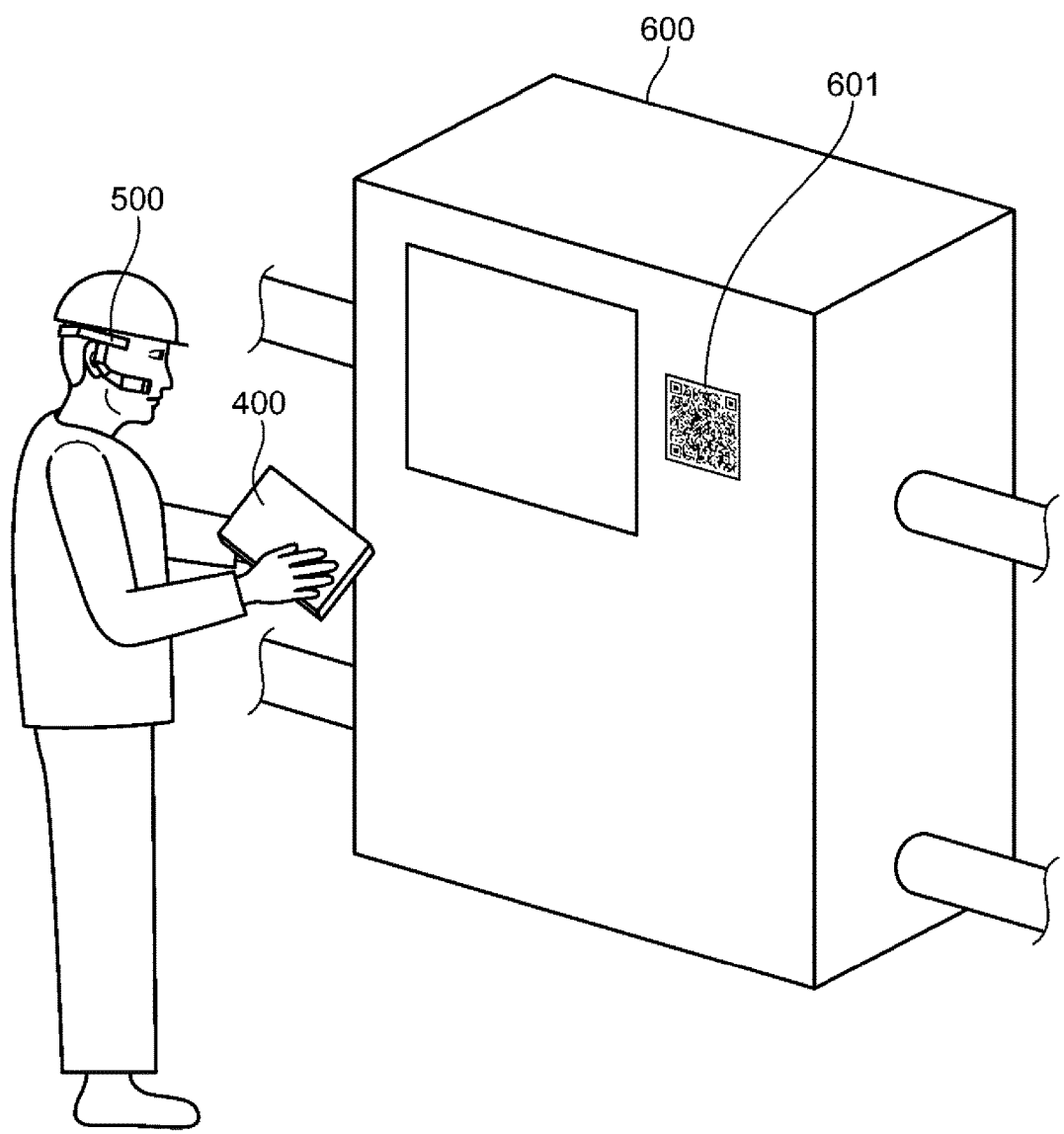
FIG. 2 is a diagram illustrating an example of a situation in which a device management apparatus and a mobile terminal illustrated in FIG. 1 are used.

FIG. 2 is a diagram illustrating an example of a situation where the device management apparatus 400 and the mobile terminal 500 illustrated in FIG. 1 are used. As illustrated in FIG. 2, the device 600 is placed in front of a worker, and the device identification label 601 is, for example, attached to an upper right portion of the device 600. The device management apparatus 400 is, for example, a tablet and is held by the worker. The mobile terminal 500 is, for example, a wearable camera and is attached to the head of the worker. The mobile terminal 500 automatically takes an image of an area in front of the worker and takes an image of the device identification label 601. Note that the device 600 to be inspected is not limited to the device having a shape of a rectangular parallelepiped illustrated in FIG. 2. Various changes such as regarding large-size equipment as a single device or regarding a part of equipment such as a pipe as a device are possible.

Figure 3:
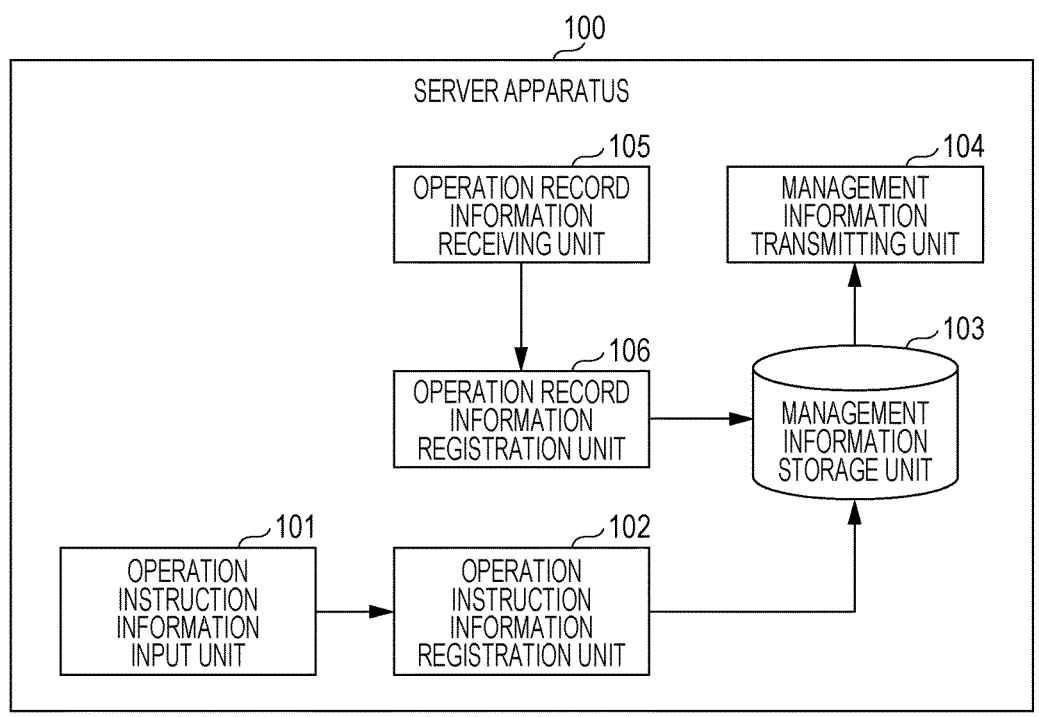
FIG. 3 is a block diagram illustrating an example of a configuration of a server apparatus illustrated in FIG. 1.

FIG. 3 is a block diagram illustrating an example of a configuration of the server apparatus 100 illustrated in FIG. 1. The server apparatus 100 includes an operation instruction information input unit 101, an operation instruction information registration unit 102, a management information storage unit 103, a management information transmitting unit 104, an operation record information receiving unit 105, and an operation record information registration unit 106.

As the operation instruction information input unit 101, for example, a central processing unit (CPU) or a micro processing unit (MPU) is used. The operation instruction information input unit 101 supplies operation instruction information input by using the input device 200 to the operation instruction information registration unit 102.

As the operation instruction information registration unit 102, for example, a CPU or an MPU is used. The operation instruction information registration unit 102 causes the operation instruction information to be stored in the management information storage unit 103.

As the management information storage unit 103, for example, a semiconductor memory or a hard disc device is used. The management information storage unit 103 stores therein management information of the device 600 supplied from the operation instruction information registration unit 102 and the operation record information registration unit 106. The management information of the device 600 includes operation instruction information and operation record information of the device 600 to be inspected and is managed in association with a device number.

As the management information transmitting unit 104, for example, a communication device is used. The management information transmitting unit 104 obtains device management information stored in the management information storage unit 103 in response to a request from an outside and transmits the management information to a designated receiving apparatus (e.g., the device management apparatus 400).

As the operation record information receiving unit 105, for example, a communication device is used. The operation record information receiving unit 105 receives operation record information transmitted from an outside (e.g., the device management apparatus 400) and supplies the operation record information to the operation record information registration unit 106.

As the operation record information registration unit 106, for example, a CPU or an MPU is used. The operation record information registration unit 106 supplies operation record information supplied from the operation record information receiving unit 105 to the management information storage unit 103 and updates management information stored in the management information storage unit 103.

Figure 4:
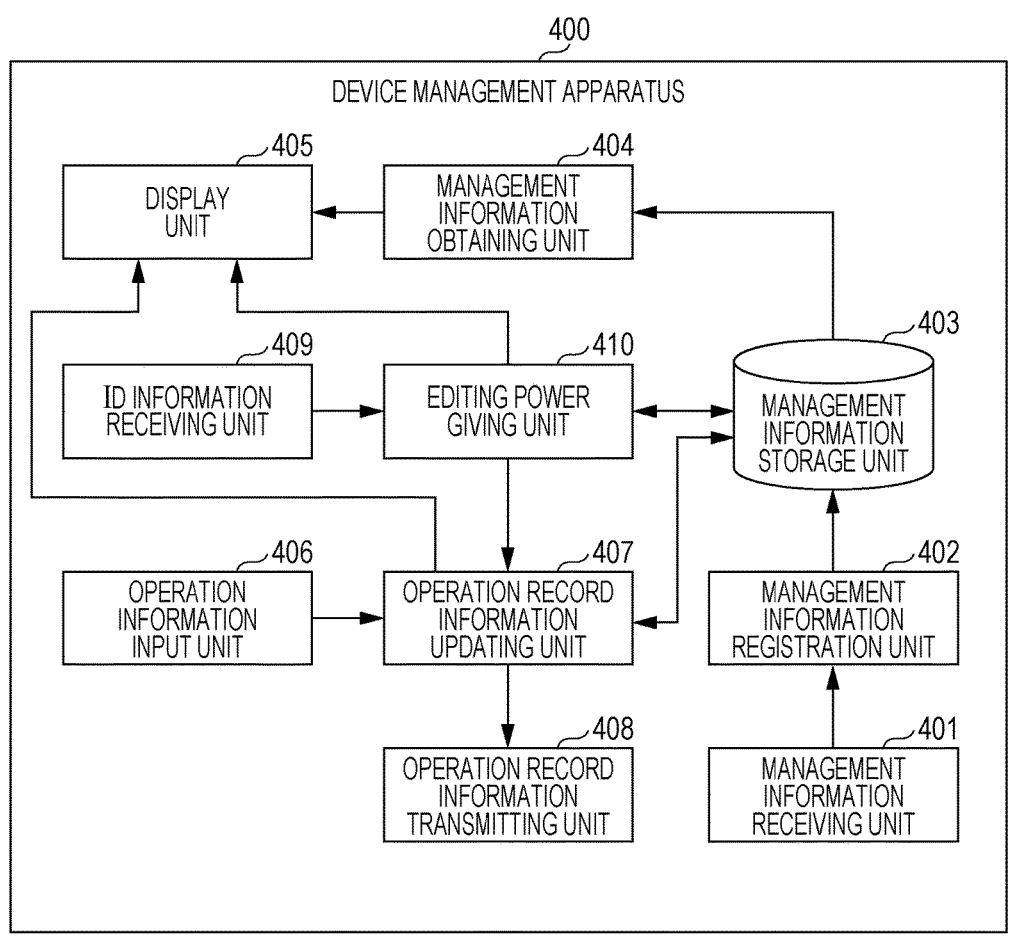
FIG. 4 is a block diagram illustrating an example of a configuration of the device management apparatus illustrated in FIG. 1.

Next, the configuration of the device management apparatus 400 (the configuration of each of the device management apparatuses 400A through 400N, which have the same configuration) is described. FIG. 4 is a block diagram illustrating an example of the configuration of the device management apparatus 400 illustrated in FIG. 1.

The device management apparatus 400 illustrated in FIG. 4 includes a management information receiving unit 401, a management information registration unit 402, a management information storage unit 403, a management information obtaining unit 404, a display unit 405, an operation information input unit 406, an operation record information updating unit 407, an operation record information transmitting unit 408, an ID information receiving unit 409, and an editing power giving unit 410.

As the management information receiving unit 401, for example, a communication device is used. The management information receiving unit 401 receives, from the server apparatus 100, a list of management information including operation instruction information and operation record information associated with a device number and supplies the list to the management information registration unit 402.

As the management information registration unit 402, for example, a CPU or an MPU is used. The management information registration unit 402 supplies management information of the device 600 received by the management information receiving unit 401 to the management information storage unit 403.

As the management information storage unit 403, for example, a semiconductor memory or a hard disc device is used. The management information storage unit 403 stores therein management information of the device 600 supplied from the management information registration unit 402. The management information of the device 600 includes operation instruction information and operation record information of the device 600 to be inspected and is managed in association with a device number.

As the management information obtaining unit 404, for example, a CPU or an MPU is used. The management information obtaining unit 404 obtains the management information of the device 600 stored in the management information storage unit 403 and supplies the management information to the display unit 405.

As the display unit 405, for example, an LCD or an organic EL display is used. The display unit 405 displays the management information of the device 600 supplied from the management information obtaining unit 404.

As the operation information input unit 406, for example, a mouse, a keyboard, a touch panel, or a touch pad is used. The operation information input unit 406 supplies operation information including operation record information and the like to the operation record information updating unit 407 in response to a worker's input operation.

As the operation record information updating unit 407, for example, a CPU or an MPU is used. The operation record information updating unit 407 updates operation record information corresponding to a selected device number by using the operation information supplied from the operation information input unit 406. The operation record information updating unit 407 has, for each device number, power of editing operation record information and can edit only operation record information corresponding to a device number for which editing power has been given by the editing power giving unit 410. In a case where editing power has been given, the operation record information updating unit 407 updates operation record information in the management information storage unit 403 and supplies the updated operation record information to the operation record information transmitting unit 408.

As the operation record information transmitting unit 408, for example, a communication device is used. The operation record information transmitting unit 408 supplies operation record information supplied from the operation record information updating unit 407 to an outside (e.g., the server apparatus 100).

As the ID information receiving unit 409, for example, a communication device is used. The ID information receiving unit 409 receives device ID information transmitted from the mobile terminal 500 and supplies the device ID information to the editing power giving unit 410.

The editing power giving unit 410 determines power of editing operation record information by using the device ID information received from the ID information receiving unit 409 and gives the determined editing power to the operation record information updating unit 407.

Figure 5:
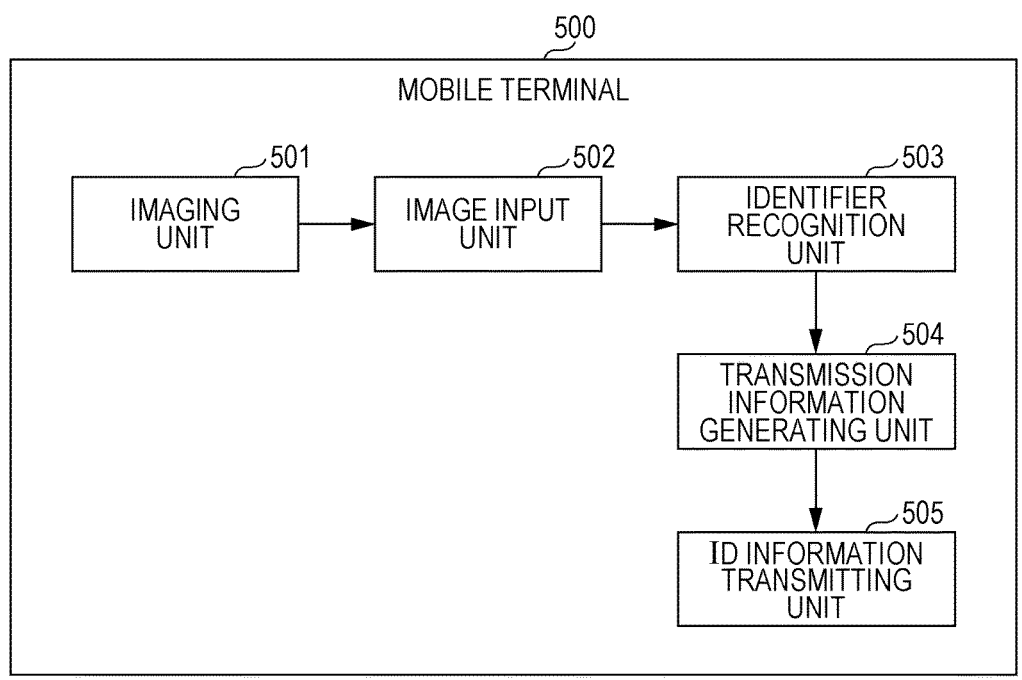
FIG. 5 is a block diagram illustrating an example of a configuration of the mobile terminal illustrated in FIG. 1.

Next, the configuration of the mobile terminal 500 (the configuration of the mobile terminals 500A through 500N, which have the same configuration) is described. FIG. 5 is a block diagram illustrating an example of the configuration of the mobile terminal 500 illustrated in FIG. 1. The mobile terminal 500 includes an imaging unit 501, an image input unit 502, an identifier recognition unit 503, a transmission information generating unit 504, and an ID information transmitting unit 505.

The imaging unit 501 includes at least a lens and an image sensor, and takes an image of the device identification label 601 of the device 600 to be inspected when the worker arrives at an inspection site, converts the taken image into an electric signal, and supplies the electric signal to the image input unit 502. Specifically, the lens collects light (light beams) that enters the mobile terminal 500 from an outside and forms an image on a predetermined imaging plane of the image sensor. The image sensor is, for example, a charge coupled device (CCD) or complementary metal oxide semiconductor (CMOS) solid-state imaging element and converts an optical image formed on the imaging plane into an electric signal.

As the image input unit 502, for example, a CPU, an MPU, or a digital signal processor (DSP) is used. The image input unit 502 generates, per frame, captured image data defined by red, green, and blue (RGB), YUV (luminance/color difference), or the like that can be recognized by human by performing predetermined signal processing by using the electric signal supplied from the imaging unit 501 and supplies the captured image data to the identifier recognition unit 503.

As the identifier recognition unit 503, for example, a CPU, an MPU, a DSP, an application specific integrated circuit (ASIC), or a field programmable gate array (FPGA) is used. The identifier recognition unit 503 recognizes the device identification label 601 (identifier) of the device 600 from the supplied captured image data, extracts device ID information from the recognized device identification label 601, and then supplies the device ID information to the transmission information generating unit 504.

The device identification label 601 is an identifier having an image that expresses device identification information of the device 600 to be inspected and is unique to the device 600. The device identification label 601 can be, for example, a code in which device ID information is embedded, for example, a one-dimensional code such as a Japanese article number (JAN) code, European article number (EAN) code, or an interleaved two of five (ITF) code or a two-dimensional code such as a QR Code (Registered Trademark) or a color code that expresses information by a color arrangement.

Since device identification information for identifying a device is expressed by using such a one-dimensional code or a two-dimensional code, a worker cannot directly obtain the device identification information from the device identification label 601. In order to obtain editing power (described later) of editing operation record information, the worker needs to read the device identification label 601 by using the mobile terminal 500. This guarantees worker's visit to the device 600 to be inspected.

In the present embodiment, a QR code is used as an example of the device identification label 601. Note, however, that a QR code is merely an example, and the device identification label 601 is not limited to this. A known technique according to the type of device identification label 601 can be used for recognition of the device identification label 601, and device ID information is supplied to the transmission information generating unit 504 as a result of recognition of the device identification label 601.

A method for obtaining device identification information from the device 600 is not limited to the above example, and the device identification information of the device 600 may be transmitted to the mobile terminal 500 by using a near field communication (NFC) tag, a radio frequency identification (RFID) tag, or the like attached to the device 600 instead of the device identification label 601.

As the transmission information generating unit 504, for example, a CPU or an MPU is used. The transmission information generating unit 504 creates transmission data from the supplied device ID information and then supplies the transmission data to the ID information transmitting unit 505. In the present embodiment, the device management apparatus 400 and the mobile terminal 500 are connected to each other over a network. In transmitting the device ID information over the network, the transmission information generating unit 504 creates a hypertext transfer protocol (HTTP) request by adding header information. The transmission data is not limited to the above example, and for example, a text file may be created in a case where the device management apparatus 400 and the mobile terminal 500 are provided as a single mobile terminal apparatus.

As the ID information transmitting unit 505, for example, a communication device is used. The ID information transmitting unit 505 supplies the transmission data including the device ID information supplied from the transmission information generating unit 504 to an outside. In the present embodiment, the ID information transmitting unit 505 transmits the transmission data to the device management apparatus 400 over a network. A text file may be transmitted in a case where the device management apparatus 400 and the mobile terminal 500 are provided as a single mobile terminal apparatus.

Figure 6:
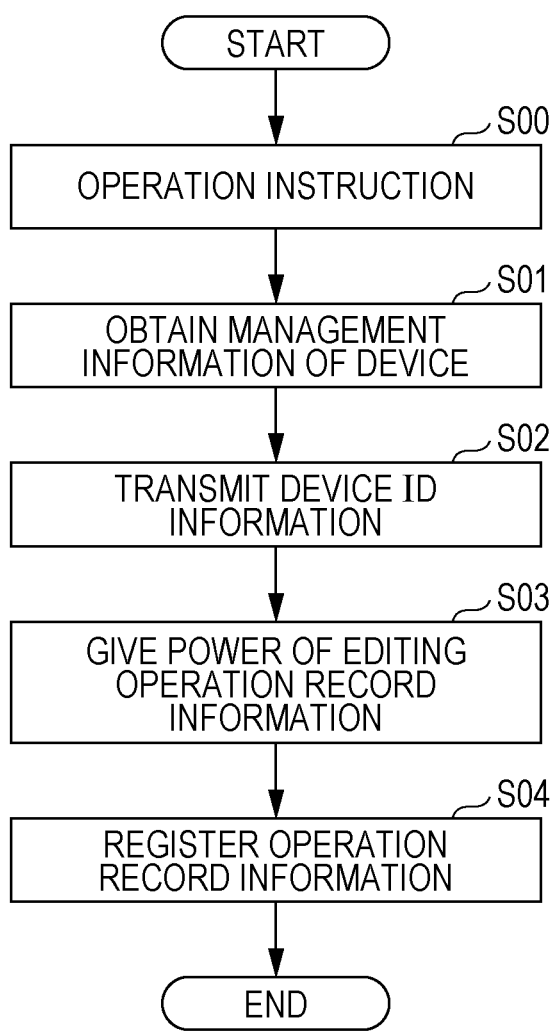
FIG. 6 is a flowchart illustrating an example of overall processing of the device inspection system illustrated in FIG. 1.

Next, overall processing of the device inspection system illustrated in FIG. 1 is described. FIG. 6 is a flowchart illustrating an example of overall processing of the device inspection system illustrated in FIG. 1.

First, to give an operation instruction concerning inspection of the device 600 from the headquarters, the input device 200 registers operation instruction information concerning the device 600 in the server apparatus 100 in response to a worker's operation (Step S00). For example, the input device 200 registers, as the operation instruction information concerning the device 600, various kinds of information necessary for inspection in the server apparatus 100 by using the operation information input screen displayed on the monitor 300. The operation instruction information includes at least a device number of the device 600 and includes other kinds of information such as a device name corresponding to the device number, an operation timing, an operation area, a worker responsible, and a past operation result. These kinds of information are merely an example, and the operation instruction information is not limited to these kinds of information. The operation instruction information thus input is stored in the management information storage unit 103 of the server apparatus 100.

Next, the device management apparatus 400 obtains management information concerning the device 600 registered in the management information storage unit 103 of the server apparatus 100 (Step S01). The device management apparatus 400 is any one of the device management apparatuses 400A through 400N, and the same processes are performed irrespective of which of the device management apparatuses 400A through 400N is used. The management information stored in the management information storage unit 103 is transmitted from the management information transmitting unit 104 of the server apparatus 100 to the device management apparatus 400 in response to a worker's request from the device management apparatus 400 to obtain management information. In the present embodiment, in which the server apparatus 100 and the device management apparatus 400 are connected to each other over a network, the management information is transmitted over the network. However, the present embodiment is not limited to this example. The management information may be supplied to an outside, for example, by using an external storage.

Through the above processes, the management information receiving unit 401 of the device management apparatus 400 receives the management information transmitted from the server apparatus 100, and the management information registration unit 402 causes the received management information to be stored in the management information storage unit 403.

After the management information of each device 600 is stored in the device management apparatus 400, a worker or a worker in a worker group responsible for inspection makes an inspection of the device 600A, for example, while holding the mobile terminal 500A and the device management apparatus 400A. The mobile terminal 500A is an example, and the same processes are performed irrespective of which of the mobile terminals 500B through 500N is used.

FIG. 7 is a diagram illustrating an example of a management information list screen displayed on the display unit 405 of the device management apparatus 400 illustrated in FIG. 4. In the device management apparatus 400, the management information obtaining unit 404 obtains the management information of the device 600 from the management information storage unit 403, and the display unit 405 displays the management information list screen illustrated in FIG. 7. Combinations of main management items such as a device number, a device name, an operation timing, an operation area, a worker responsible, a determination result, and an operation status are displayed as a table on the management information list screen of the display unit 405 illustrated in FIG. 7. When management information of a device is selected from the management information list screen displayed on the display unit 405 of the device management apparatus 400, an operation instruction information screen (see FIG. 8 that will be described later) is displayed as details of operation instruction information corresponding to the device.

Next, the mobile terminal 500 obtains device ID information of the device 600 by reading the device identification label 601 provided on the device 600 and transmits the device ID information to the device management apparatus 400 (Step S02). The device 600 to be inspected has the device identification label 601 such as a QR code corresponding to the device number of the device 600, and the worker obtains device ID information by reading the device identification label 601 provided on the device 600 by using the mobile terminal 500 and transmits the device ID information to the device management apparatus 400.

Next, the editing power giving unit 410 of the device management apparatus 400 gives the worker power of editing operation record information stored in the management information storage unit 403 in a case where the device ID information received by the ID information receiving unit 409 and device ID information included in operation instruction information stored in the management information storage unit 403 match each other (Step S03).

FIG. 8 is a diagram illustrating an example of an operation instruction information screen displayed on the display unit 405 of the device management apparatus 400 illustrated in FIG. 4. For example, management information P1, an operation procedure P2, a device drawing P3 (e.g., a drawing of a bulb), and a record creation button B1 of the device 600 are displayed on the operation instruction information screen illustrated in FIG. 8, but these items are merely an example and items displayed on the operation instruction information screen are not limited to these items.

The worker inspects the device 600 while referring to the management information P1 and the operation procedure P2 of the device 600 displayed on the display unit 405. After finishing the inspection of the device 600, the worker makes a request of creation of an operation record on the operation instruction information screen of the device management apparatus 400 in order to input operation record information and thereby causes the display unit 405 to display an operation record information input screen.

For example, the worker presses, as the request of creation of an operation record, the record creation button B1 on the operation instruction information screen by using the operation information input unit 406. In a case where editing power has not been given by the editing power giving unit 410, the record creation button B1 is not displayed on the operation instruction information screen, and the worker is not allowed to input and register operation record information. Meanwhile, in a case where editing power has been given by the editing power giving unit 410, the record creation button B1 is displayed on the operation instruction information screen.

Figure 9:
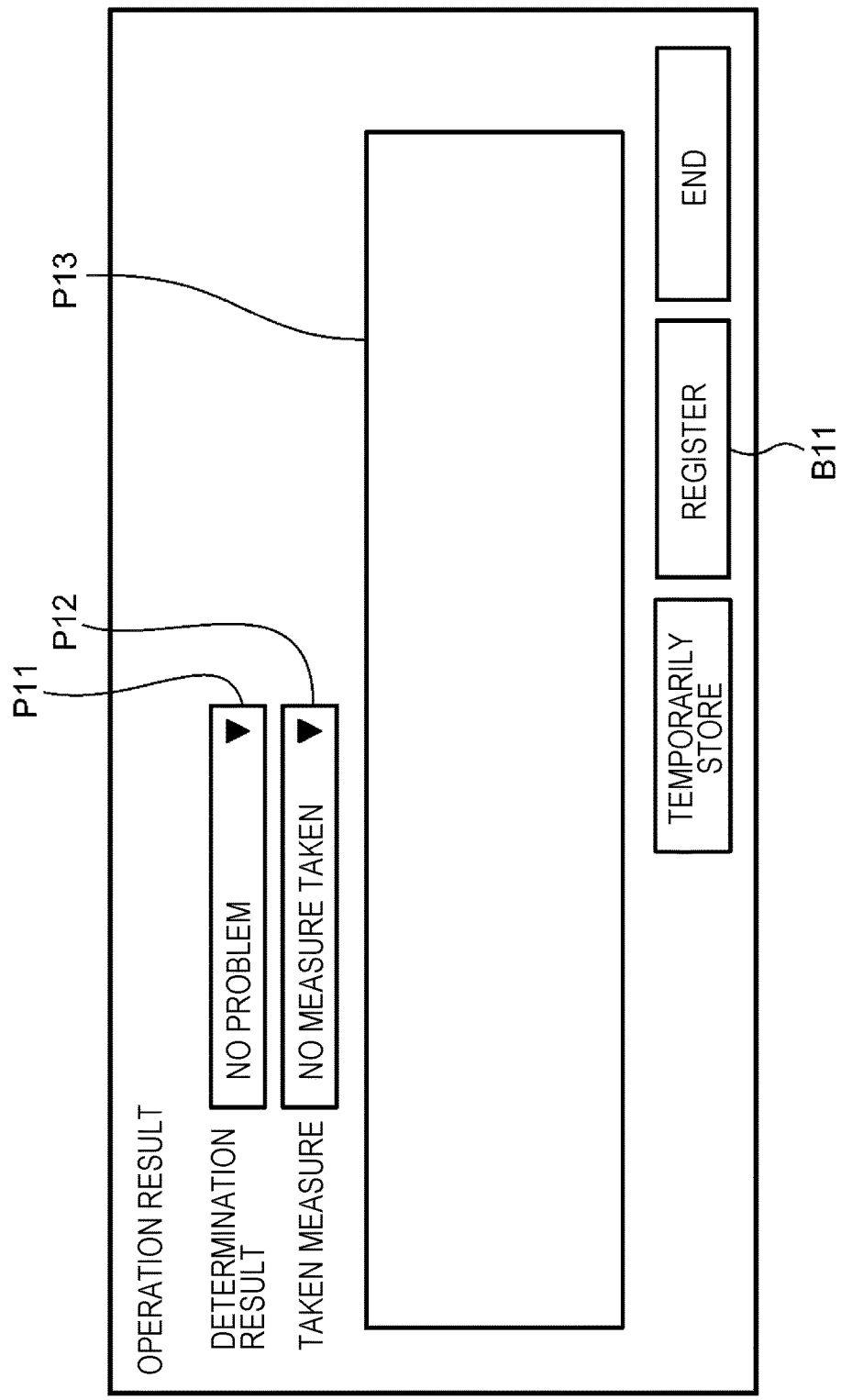
FIG. 9 is a diagram illustrating an example of an operation record information input screen displayed on the display unit of the device management apparatus illustrated in FIG. 4.

FIG. 9 is a diagram illustrating an example of an operation record information input screen displayed on the display unit 405 of the device management apparatus 400 illustrated in FIG. 4. For example, a determination result P11, a taken measure P12, a comment column P13, and a registration button B11 of the device 600 to be inspected are displayed on the operation record information input screen illustrated in FIG. 9, but these items are merely an example and items displayed on the operation record information input screen are not limited to these items.

After finishing inspection of the device 600, the worker inputs and registers operation record information including an inspection result of the device 600 by using the operation record information input screen. By thus requesting registration on the operation record information input screen by using the device management apparatus 400, the operation record information is registered. For example, the worker presses, as the request of registration, the registration button B11 on the operation record information input screen.

Finally, when the worker inputs an inspection result after the inspection, the operation record information updating unit 407 updates operation record information in the management information storage unit 403 for which editing power has been given by the editing power giving unit 410 and transmits the updated operation record information to the server apparatus 100 by using the operation record information transmitting unit 408. The server apparatus 100 registers the received operation record information in the management information storage unit 103 by using the operation record information receiving unit 105 and the operation record information registration unit 106 (Step S04).

The above is the description of the overall processing of the device inspection system. Next, details of processing performed during device inspection (Step S02) in which the mobile terminal 500 reads the device identification label 601 and transmits information thus obtained to the device management apparatus 400 are described.

Figure 10:
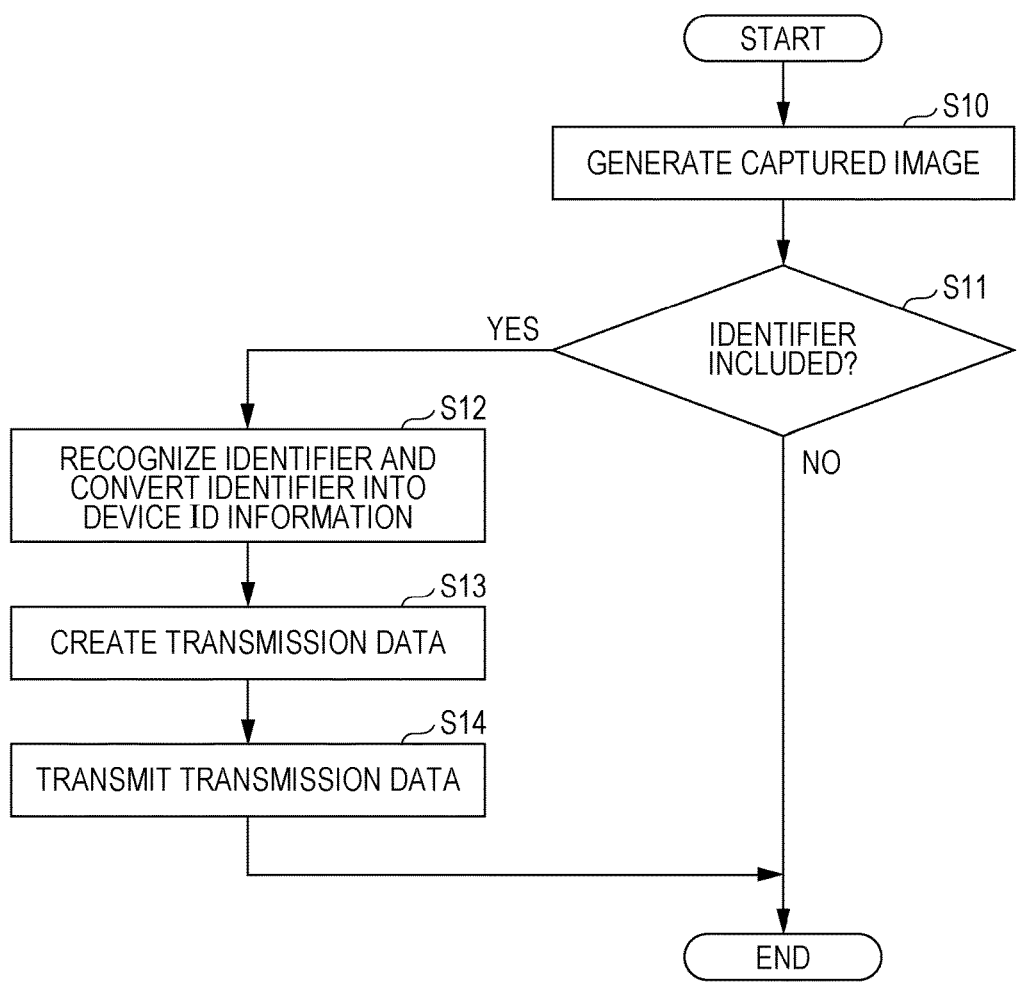
FIG. 10 is a flowchart illustrating an example of processing performed during device inspection by the mobile terminal illustrated in FIG. 5.

FIG. 10 is a flowchart illustrating an example of the processing performed during device inspection by the mobile terminal 500 illustrated in FIG. 5.

First, the image input unit 502 of the mobile terminal 500 generates captured image data from an image taken by the imaging unit 501 and supplies the captured image data to the identifier recognition unit 503 (Step S10). The image input unit 502 regularly generates captured image data at a predetermined frame rate, and the following processes are repeatedly performed on captured image data of respective frames.

Next, the identifier recognition unit 503 detects whether or not the supplied captured image data includes the device identification label 601 that is an identifier (Step S11). A known technique such as the one used to read a QR code may be used for detection of the device identification label 601. In a case where the captured image data of the frame does not include the device identification label 601 (NO in Step S11), nothing is done to the captured image data of the frame, and the processing ends. In a case where the captured image data of the frame includes the device identification label 601 (YES in Step S11), the processing proceeds to Step S12.

Next, the identifier recognition unit 503 recognizes the device identification label 601 from the captured image data by using a known technique and converts the device identification label 601 into device ID information (Step S12).

Next, the transmission information generating unit 504 creates transmission data by using the device ID information thus obtained (Step S13).

Next, the ID information transmitting unit 505 transmits the created transmission data to the device management apparatus 400 over a network (Step S14). Then, the processes in Step S10 and the subsequent steps are repeated to process captured image data of a next frame.

Next, details of processing performed during device inspection (Step S03) in which the device management apparatus 400 gives power of editing operation record information after receiving device ID information are described.

Figure 11:
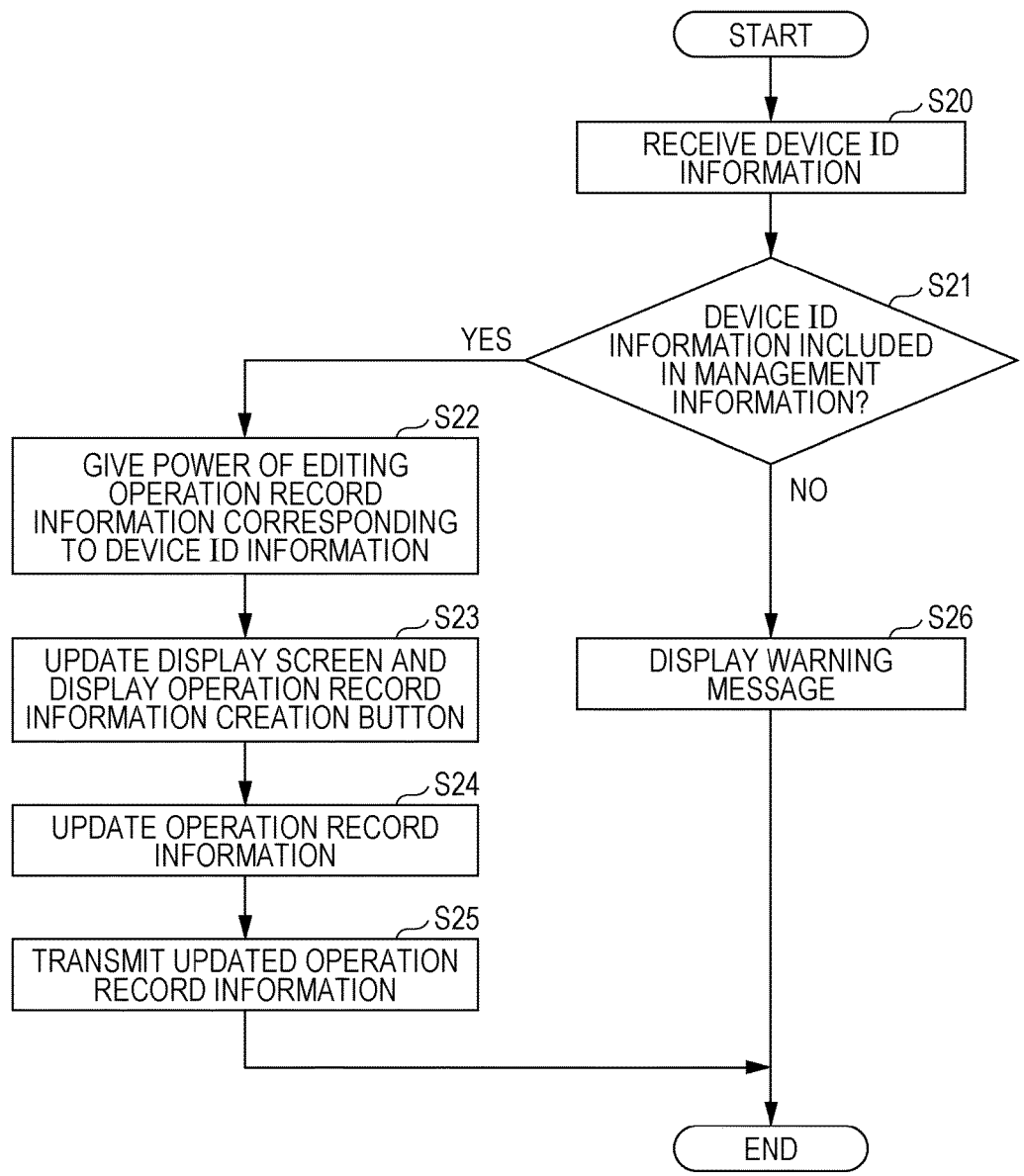
FIG. 11 is a flowchart illustrating an example of processing performed during device inspection by the device management apparatus illustrated in FIG. 4.

FIG. 11 is a flowchart illustrating an example of the processing performed during device inspection by the device management apparatus 400 illustrated in FIG. 4.

First, the ID information receiving unit 409 of the device management apparatus 400 receives device ID information corresponding to the device number of the device 600 from the mobile terminal 500 (Step S20).

Next, the editing power giving unit 410 determines whether or not the received device ID information is included in operation instruction information of management information stored in the management information storage unit 403 (Step S21). In a case where the received device ID information is included in the operation instruction information of the management information (YES in Step S21), the processing proceeds to Step S22. Meanwhile, in a case where the received device ID information is not included in the operation instruction information of the management information (NO in Step S21), the processing proceeds to Step S26.

In a case where the received device ID information is included in the operation instruction information (YES in Step S21), the editing power giving unit 410 gives the operation record information updating unit 407 power of editing operation record information corresponding to the device ID information (Step S22).

Next, the operation record information updating unit 407 given the editing power causes an operation record information creation button (e.g., the record creation button B1 illustrated in FIG. 8) to be displayed by updating a screen displayed on the display unit 405 (Step S23).

Next, when the operation record information creation button is pressed, the operation information input unit 406 supplies various kinds of information on an operation result input by a worker to the operation record information updating unit 407, and the operation record information updating unit 407 updates operation record information in the management information storage unit 403 (Step S24).

Next, when the operation record information in the management information storage unit 403 is updated, the operation record information updating unit 407 transmits the updated operation record information to the server apparatus 100 by using the operation record information transmitting unit 408 (Step S25). This allows a person at the headquarters to also check the inspection result of the device 600.

Meanwhile, in a case where the device ID information is not included in the operation instruction information (NO in Step S21), the editing power giving unit 410 instructs the display unit 405 to display a message warning that the worker is trying to inspect a wrong device, and the display unit 405 displays the message warning that the worker is trying to inspect a wrong device (Step S26). This makes it possible to prevent false recognition of the device 600.

As described above, according to the configuration of the device inspection system according to Embodiment 1, a worker is allowed to inspect the device 600 to be inspected without false recognition by giving the worker power of editing operation record information by the device management apparatus 400 and the mobile terminal 500 that use device ID information of the device 600 to be inspected and device ID information included in operation instruction information.

Furthermore, the worker needs to go in front of the device 600 to be inspected and use the mobile terminal 500 to recognize the device identification label 601 provided on the device 600. This makes it possible to prevent the worker from creating a false operation record without visiting the device 600 to be inspected.

In a case where an inspection route of a plurality of devices 600 is preset, the device management apparatus 400 may determine whether or not received device ID information matches the preset order of the devices defined by the inspection route and present the preset inspection route and a device to be inspected next on the screen in a case where the received device ID information does not match the preset order.

Specifically, the operation instruction information further includes inspection order information indicative of the order of inspection of the devices 600 to be inspected. In a case where received device ID information does not match device ID information of a device specified by the inspection order indicated by the inspection order information included in the operation instruction information stored in the management information storage unit 403, the editing power giving unit 410 instructs the display unit 405 to display device ID information of a device 600 to be inspected next, and the display unit 405 displays the device ID information of the device 600 to be inspected next. This makes it possible to prevent false recognition of the inspection route.

Embodiment 2

Next, a device inspection system according to Embodiment 2 of the present disclosure is described. In the present embodiment, in addition to the configuration of Embodiment 1, power of editing operation record information is given by using individual ID information (individual identification information) for identifying a worker or a worker group (individual) in addition to device ID information of a device.

That is, the configuration of the device inspection system according to the present embodiment is similar to that of the device inspection system illustrated in FIG. 1, the configuration of a device management apparatus according to the present embodiment is similar to that of the device management apparatus 400 illustrated in FIG. 4, and the configuration of a mobile terminal apparatus according to the present embodiment is similar to that of the mobile terminal 500 illustrated in FIG. 5. Illustration and description of parts identical to those in Embodiment 1 are omitted, and differences from Embodiment 1 are described in detail below.

Operation instruction information that is transmitted from a server apparatus 100 in response to an operation instruction from headquarters includes at least individual ID information of a worker or a worker group who is scheduled to perform an operation in addition to device ID information that is a device number of a device 600. Accordingly, a management information storage unit 103 of the server apparatus 100 and a management information storage unit 403 of a device management apparatus 400 store therein, as management information of the device 600, operation instruction information including at least device ID information and individual ID information.

Figure 12:
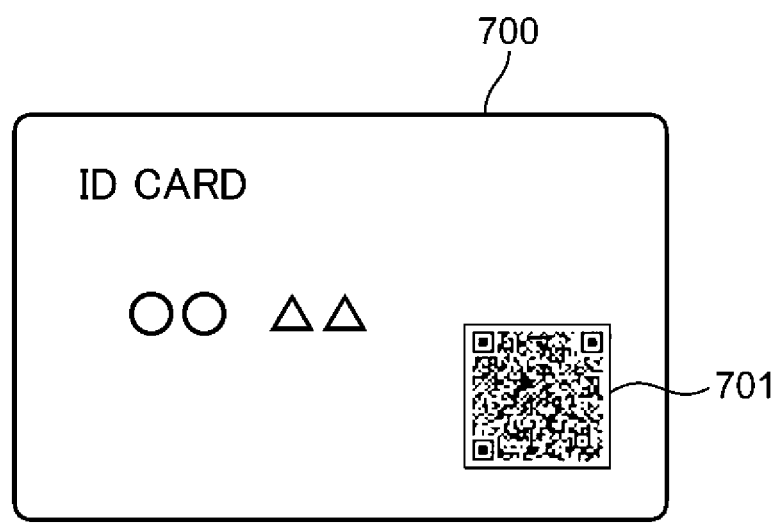
FIG. 12 is a diagram illustrating an example of an ID card used in a device inspection system according to Embodiment 2 of the present disclosure.

Furthermore, a worker who inspects the device 600 carries an ID card (identification card) having an individual identification label that is an identifier corresponding to individual ID information. FIG. 12 is a diagram illustrating an example of the ID card used in the device inspection system according to Embodiment 2 of the present disclosure. An individual identification label 701 is printed on an ID card 700 illustrated in FIG. 12 in addition to a name and the like printed on a typical ID card. The individual identification label 701 is an identifier having an image that expresses individual identification information for identifying a worker (or a group to which the worker belongs) who inspects the device 600 and is unique to the worker (or the group to which the worker belongs). In the present embodiment, the individual identification label 701 is, for example, a QR Code (Registered Trademark).

For example, the worker brings the ID card 700 to a position where the mobile terminal 500 can take an image of the ID card 700, and the mobile terminal 500 also takes an image of the individual identification label 701 on the ID card concurrently with an image of a device identification label 601 of the device 600. In this case, the worker needs to read both of the device identification label 601 and the individual identification label 701 concurrently by using the mobile terminal 500 in order to obtain power of editing operation record information. This makes it possible to guarantee worker's visit to the device 600 to be inspected.

The configuration of the individual identification label is not limited to the above example. Various changes such as using an individual identification label provided on a member which the worker wears such as a wristband or using a one-dimensional code such as a JAN code, an EAN code, or an ITF code or a two-dimensional code such as a color code as in the case of the device identification label 601 are possible.

In view of the above differences, overall processing of the device inspection system according to the present embodiment is different from that of the device inspection system according to Embodiment 1 in the process in Step S02 (the processing performed during device inspection by the mobile terminal 500) and the process in Step S03 (processing performed during device inspection by the device management apparatus 400) in the flowchart illustrated in FIG. 6. Other processes are similar to those in Embodiment 1, and therefore detailed description thereof is omitted. Only the different processes are described below.

Figure 13:
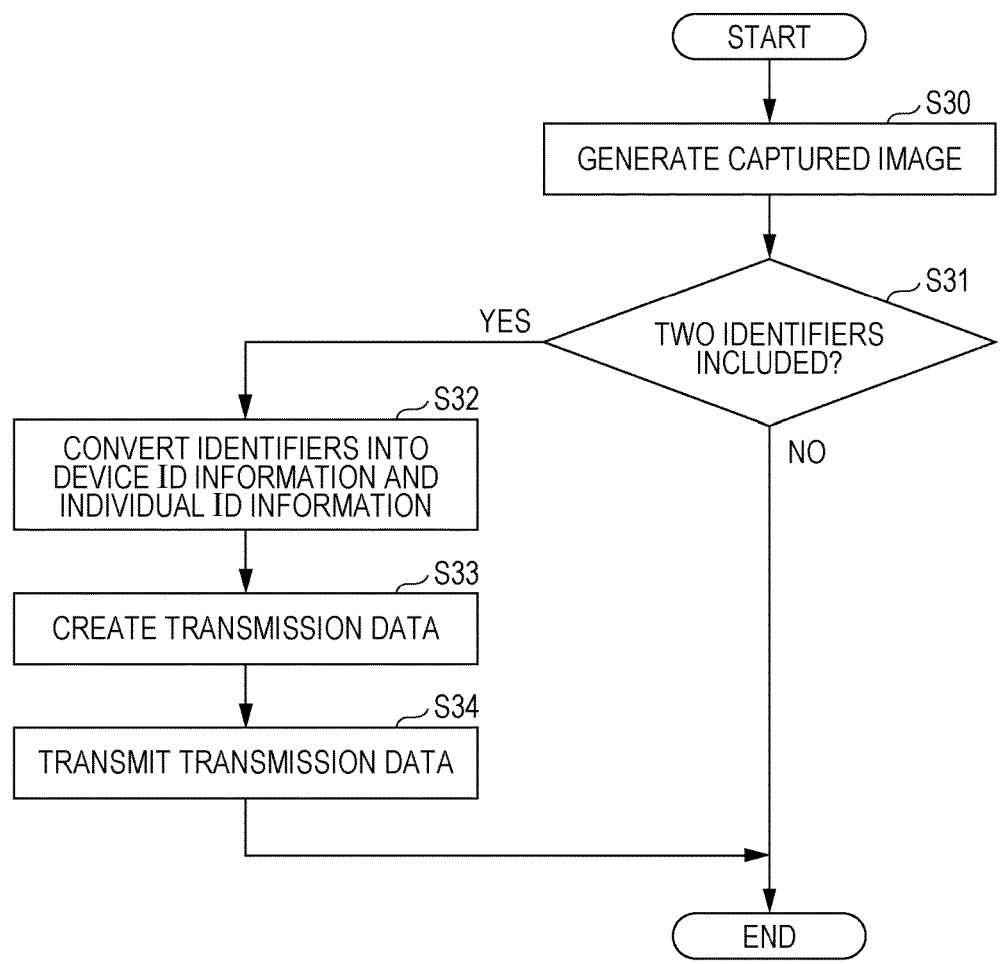
FIG. 13 is a flowchart illustrating an example of processing performed during device inspection by a mobile terminal of the device inspection system according to Embodiment 2 of the present disclosure.

FIG. 13 is a flowchart illustrating an example of processing performed during device inspection by the mobile terminal 500 of the device inspection system according to Embodiment 2 of the present disclosure.

First, an image input unit 502 of the mobile terminal 500 generates captured image data from an image taken by an imaging unit 501 and supplies the captured image data to an identifier recognition unit 503 (Step S30), as in Embodiment 1. The image input unit 502 regularly generates captured image data at a predetermined frame rate, and the following processes are repeatedly performed on captured image data of respective frames.

Next, the identifier recognition unit 503 determines whether or not the supplied captured image data includes two identifiers, i.e., the device identification label 601 and the individual identification label 701 (Step S31). A known technique such as the one used to read a QR code may be used for detection of the device identification label 601 and the individual identification label 701. In a case where the captured image data of the subject frame does not include the device identification label 601 and the individual identification label 701 (in a case where the captured image data does not include at least one of these identifiers) (NO in Step S31), nothing is done to the captured image data of the subject frame, and the processing ends. In a case where the captured image data of the subject frame includes the device identification label 601 and the individual identification label 701 (YES in Step S31), the processing proceeds to Step S32.

Next, the identifier recognition unit 503 recognizes the device identification label 601 and the individual identification label 701 by using a known technique and then converts the device identification label 601 and the individual identification label 701 into device ID information and individual ID information (Step S32).

Next, a transmission information generating unit 504 creates transmission data by using the device ID information and the individual ID information thus obtained (Step S33).

Next, an ID information transmitting unit 505 transmits the transmission data to the device management apparatus 400 over a network (Step S34). Then, the processes in Step S30 and the subsequent steps are repeated to process captured image data of a next frame.

Next, details of processing performed during device inspection in which the device management apparatus 400 gives power of editing operation record information after receiving device ID information and individual ID information are described.

Figure 14:
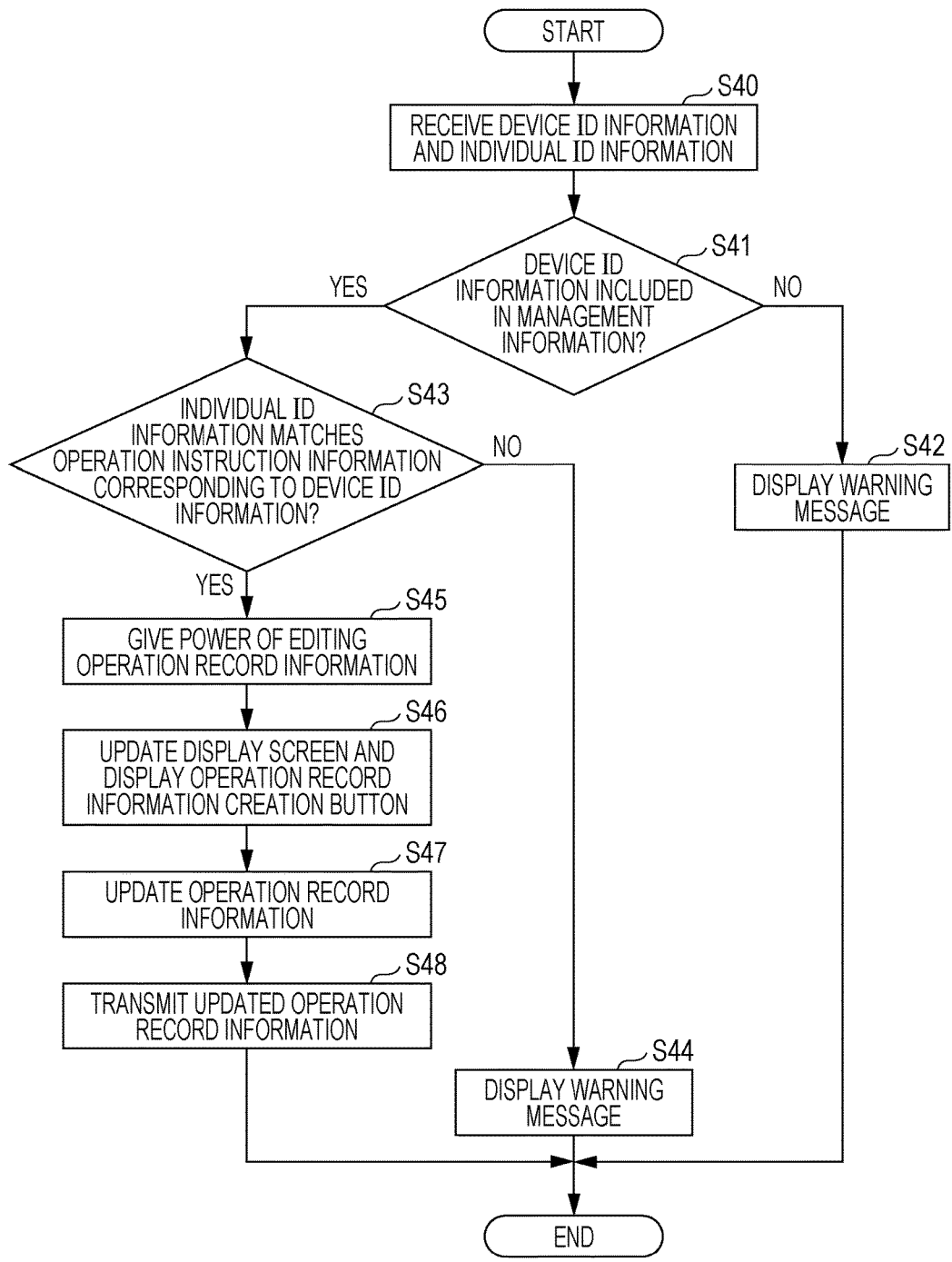
FIG. 14 is a flowchart illustrating an example of processing performed during device inspection by a device management apparatus of the device inspection system according to Embodiment 2 of the present disclosure.

FIG. 14 is a flowchart illustrating an example of the processing performed during device inspection by the device management apparatus 400 of the device inspection system according to Embodiment 2 of the present disclosure.

First, an ID information receiving unit 409 of the device management apparatus 400 receives device ID information corresponding to a device number of the device 600 and individual ID information representative of a worker or a worker group from the mobile terminal 500 (Step S40).

Next, an editing power giving unit 410 determines whether or not the received device ID information is included in operation instruction information of management information stored in a management information storage unit 403 (Step S41). In a case where the received device ID information is not included in the operation instruction information of the management information (NO in Step S41), the processing proceeds to Step S42. In a case where the received device ID information is included in the operation instruction information of the management information (YES in Step S41), the processing proceeds to Step S43.

In a case where the received device ID information is not included in the operation instruction information (NO in Step S41), the editing power giving unit 410 instructs a display unit 405 to display a message warning that the worker is trying to inspect a wrong device, and the display unit 405 displays the message warning that the worker is trying to inspect a wrong device (Step S42). This makes it possible to prevent false recognition of the device 600.

In a case where the received device ID information is included in the operation instruction information (YES in Step S41), the editing power giving unit 410 extracts operation instruction information corresponding to the received device ID information from the operation instruction information of the management information stored in the management information storage unit 403 and then determines whether or not the received individual ID information matches individual ID information associated with an operation target included in the operation instruction information corresponding to the received device ID information (Step S43).

In a case where the received individual ID information does not match the individual ID information included in the operation instruction information corresponding to the received device ID information (NO in Step S43), the processing proceeds to Step S44. Meanwhile, in a case where the received individual ID information matches the individual ID information included in the operation instruction information corresponding to the received device ID information (YES in Step S43), the processing proceeds to Step S45.

In a case where the received individual ID information does not match the individual ID information included in the operation instruction information corresponding to the received device ID information (NO in Step S43), the editing power giving unit 410 instructs the display unit 405 to display a message warning that the worker is not a worker responsible, and the display unit 405 displays the message warning that the worker is not a worker responsible (Step S44). This makes it possible to prevent false recognition of the device 600.

Meanwhile, in a case where the received individual ID information matches the individual ID information included in the operation instruction information corresponding to the received device ID information (YES in Step S43), the editing power giving unit 410 gives an operation record information updating unit 407 power of editing operation record information corresponding to the device ID information (Step S45).

Next, the operation record information updating unit 407 given the editing power causes an operation record information creation button (e.g., the record creation button B1 illustrated in FIG. 8) to be displayed by updating a screen displayed on the display unit 405 (Step S46).

Next, when the operation record information creation button is pressed, an operation information input unit 406 supplies various kinds of information on an operation result input by the worker to the operation record information updating unit 407, and the operation record information updating unit 407 updates the operation record information in the management information storage unit 403 (Step S47).

Next, when the operation record information in the management information storage unit 403 is updated, the operation record information updating unit 407 transmits the updated operation record information to the server apparatus 100 by using an operation record information transmitting unit 408 (Step S48). This allows a person at the headquarters to also check the inspection result of the device 600.

As described above, according to the configuration of the device inspection system according to Embodiment 2, a worker is allowed to inspect the device 600 to be inspected without false recognition by giving the worker power of editing operation record information by causing the device management apparatus 400 and the mobile terminal 500 to concurrently read device ID information of the device 600 to be inspected and individual ID information for identifying the worker and use the device ID information and individual ID information thus read and device ID information and individual ID information included in operation instruction information.

Furthermore, the worker needs to go in front of the device 600 to be inspected and use the mobile terminal 500 to recognize the device identification label 601 provided on the device 600 and the individual identification label 701 on the ID card 700. This makes it possible to prevent the worker from creating false operation record information without visiting the device 600 to be inspected.

Furthermore, according to the device inspection system according to Embodiment 2, it is possible to prevent a worker from mistakenly inspecting a device 600 for which another worker is responsible.

In the present embodiment, the mobile terminal 500 takes an image of the ID card 700 having the individual identification label 701 corresponding to individual ID information concurrently with an image of the device identification label 601 of the device 600. Alternatively, it is also possible to employ an arrangement in which the mobile terminal 500 separately takes an image of the device identification label 601 of the device 600 and an image of the individual identification label 701 of the ID card 700 and transmits, to the device management apparatus 400, information on a timing at which the device identification label 601 is read and information on a timing at which the individual identification label 701 is read in addition to device ID information and individual ID information, and the image of the device identification label 601 and the image of the individual identification label 701 are considered to have been taken concurrently in a case where a difference between the timing at which the device identification label 601 is read and a timing at which the individual identification label 701 is read is within a predetermined period.

Specifically, the operation instruction information further includes individual identification information for identifying a worker who inspects the device 600, and the worker carries the ID card 700 having the individual identification label 701 having an image that expresses individual identification information of the worker and is unique to the worker.

The imaging unit 501 and the image input unit 502 of the mobile terminal 500 read the device identification label 601 on the device 600 and supply a timing at which the device identification label 601 is read to the identifier recognition unit 503 together with captured image data generated from the read image. The imaging unit 501 and the image input unit 502 read the individual identification label 701 on the ID card 700 carried by the worker at a timing different from the timing at which the device identification label 601 is read (before or after the timing at which the device identification label 601 is read) and supply the timing at which the individual identification label 701 is read to the identifier recognition unit 503 together with captured image data generated from the read image. The identifier recognition unit 503 specifies, from the respective captured image data, device identification information corresponding to the read device identification label 601 and individual identification information corresponding to the read individual identification label 701 and supplies the specified device identification information and individual identification information and the timings to the transmission information generating unit 504. The transmission information generating unit 504 creates transmission data including the specified device identification information and individual identification information and the timings and transmits the created transmission data to the device management apparatus 400 by using the ID information transmitting unit 505.

The ID information receiving unit 409 of the device management apparatus 400 receives the transmission data including the device identification information and individual identification information and the timings from the mobile terminal 500 and then supplies the transmission data to the editing power giving unit 410. The editing power giving unit 410 makes operation record information editable in a case where an interval between the timing at which the device identification label 601 is read and the timing at which the individual identification label 701 is read is within a predetermined period, the received device identification information matches device identification information of the device to be inspected included in operation instruction information stored in the management information storage unit 403, and the received individual identification information matches individual identification information of the device to be inspected included in operation instruction information stored in the management information storage unit 403.

In this case, matching of the device identification information of the device 600 to be inspected and matching of the individual identification information of the worker are checked only in a case where an interval between the timing at which the device identification label is read and the timing at which the individual identification label is read is within the predetermined period. This makes it possible to prevent, with certainty, the worker from creating operation record information on the basis of false recognition of the device to be inspected and to prevent, with certainty, the worker from creating false operation record information without visiting the device to be inspected by guaranteeing worker's visit to the device to be inspected even in a case where a plurality of devices 600 are inspected and where the device identification label 601 and the individual identification label 701 carried by the worker are separately read.

In a case where an inspection route of a plurality of devices 600 is preset, the device management apparatus 400 may determine whether or not received device ID information matches the preset order of the devices defined by the inspection route and present the preset inspection route and a device to be inspected next on a screen in a case where the received device ID information does not match the preset order.

Specifically, the operation instruction information further includes, for each individual identification information, inspection order information indicative of the order of inspection of devices to be inspected. In a case where received device ID information does not match device ID information of a device specified by the inspection order indicated by the inspection order information that is included, in association with the received individual ID information, in the operation instruction information stored in the management information storage unit 403, the editing power giving unit 410 instructs the display unit 405 to display device ID information of a device to be inspected next, and the display unit 405 displays the device ID information of the device to be inspected next. This makes it possible to prevent each worker from mistakenly recognizing the inspection route. The same applies to the embodiments described later.

Embodiment 3

Next, a device inspection system according to Embodiment 3 of the present disclosure is described. In the present embodiment, in addition to the configuration of Embodiment 1, power of editing operation record information is given by using individual ID information (individual identification information) for identifying a worker or a worker group (individual) in addition to device ID information of a device as in Embodiment 2. In the present embodiment, however, individual ID information is registered in a mobile terminal before inspection of a device.

That is, the configuration of the device inspection system according to the present embodiment is similar to that of the device inspection system illustrated in FIG. 1 except for a mobile terminal, and the configuration of a device management apparatus according to the present embodiment is similar to that of the device management apparatus 400 illustrated in FIG. 4. Illustration and description of parts that are identical to those in Embodiments 1 and 2 are omitted, and differences from Embodiments 1 and 2 are described in detail below.

Figure 15:
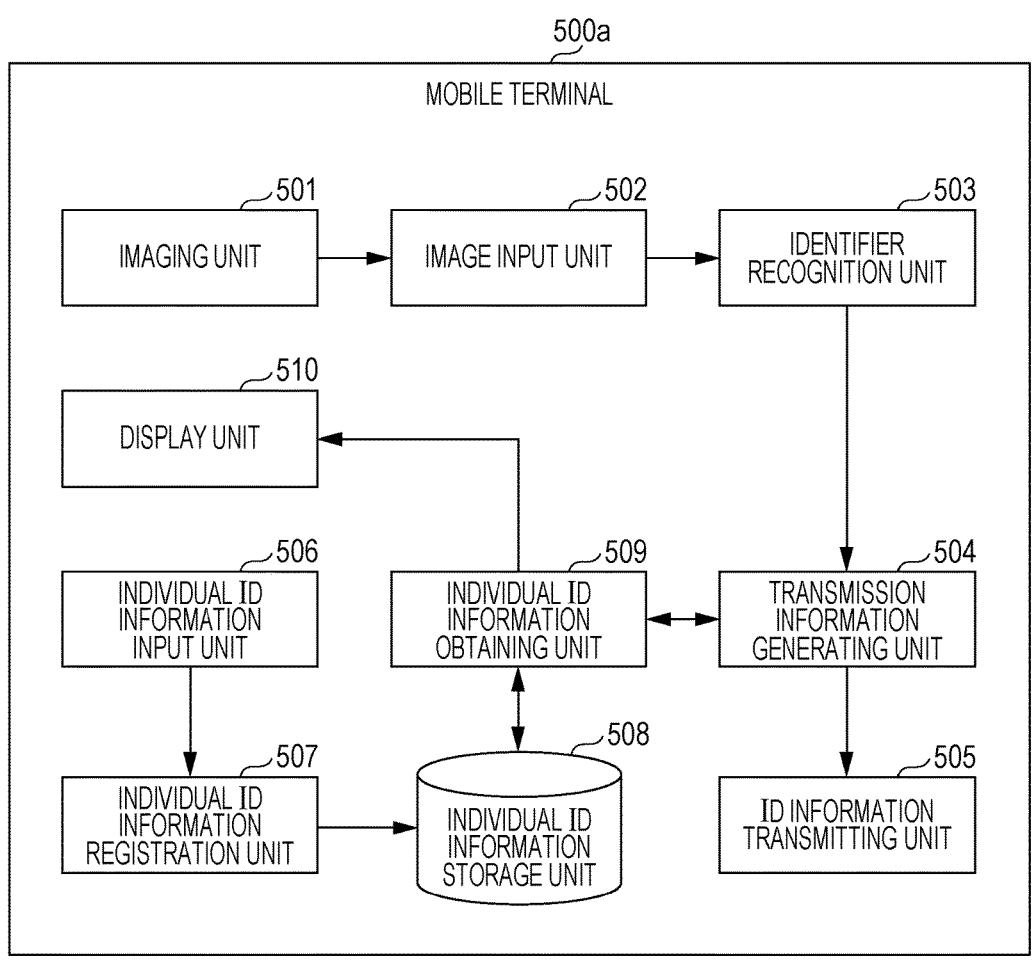
FIG. 15 is a block diagram illustrating an example of a configuration of a mobile terminal of a device inspection system according to Embodiment 3 of the present disclosure.

FIG. 15 is a block diagram illustrating an example of a configuration of a mobile terminal of the device inspection system according to Embodiment 3 of the present disclosure. In FIG. 15, constituent elements that are identical to those of the mobile terminal 500 illustrated in FIG. 5 are given identical reference signs, and description thereof is omitted.

In the present embodiment, a mobile terminal 500a illustrated in FIG. 15 is used instead of the mobile terminal 500 illustrated in FIG. 5. The mobile terminal 500a illustrated in FIG. 15 includes an individual ID information input unit 506, an individual ID information registration unit 507, an individual ID information storage unit 508, an individual ID information obtaining unit 509, and a display unit 510 in addition to an imaging unit 501, an image input unit 502, an identifier recognition unit 503, a transmission information generating unit 504, and an ID information transmitting unit 505 illustrated in FIG. 5. The imaging unit 501, the image input unit 502, the identifier recognition unit 503, the transmission information generating unit 504, and the ID information transmitting unit 505 have similar configurations to those in Embodiment 2 and operate in similar manners to those in Embodiment 2.

As the individual ID information input unit 506, for example, a mouse, a keyboard, a touch panel, or a touch pad is used. The individual ID information input unit 506 is used to input individual ID information of a worker responsible for inspection. The individual ID information input unit 506 may be a microphone by which individual ID information is input by voice or may be a lens and an image sensor by which an identifier such as a QR code that expresses individual ID information is read and is converted into the individual ID information. The individual ID information input unit 506 supplies the input individual ID information to the individual ID information registration unit 507.

As the individual ID information registration unit 507, for example, a CPU or an MPU is used. The individual ID information registration unit 507 causes the individual ID information supplied from the individual ID information input unit 506 to be stored in the individual ID information storage unit 508.

As the individual ID information storage unit 508, for example, a semiconductor memory or a hard disc device is used. Only a single piece of individual ID information supplied from the individual ID information input unit 506 is stored in the individual ID information storage unit 508.

As the individual ID information obtaining unit 509, for example, a CPU or an MPU is used. The individual ID information obtaining unit 509 obtains the individual ID information stored in the individual ID information storage unit 508 and supplies the individual ID information to the transmission information generating unit 504 when the transmission information generating unit 504 generates transmission data.

As the display unit 510, for example, an LCD or an organic EL display is used. The display unit 510 is used to notify the worker who carries the mobile terminal 500a about various kinds of information. The display unit 510 may include a speaker or the like and notify the worker about various kinds of information by voice.

Figure 16:
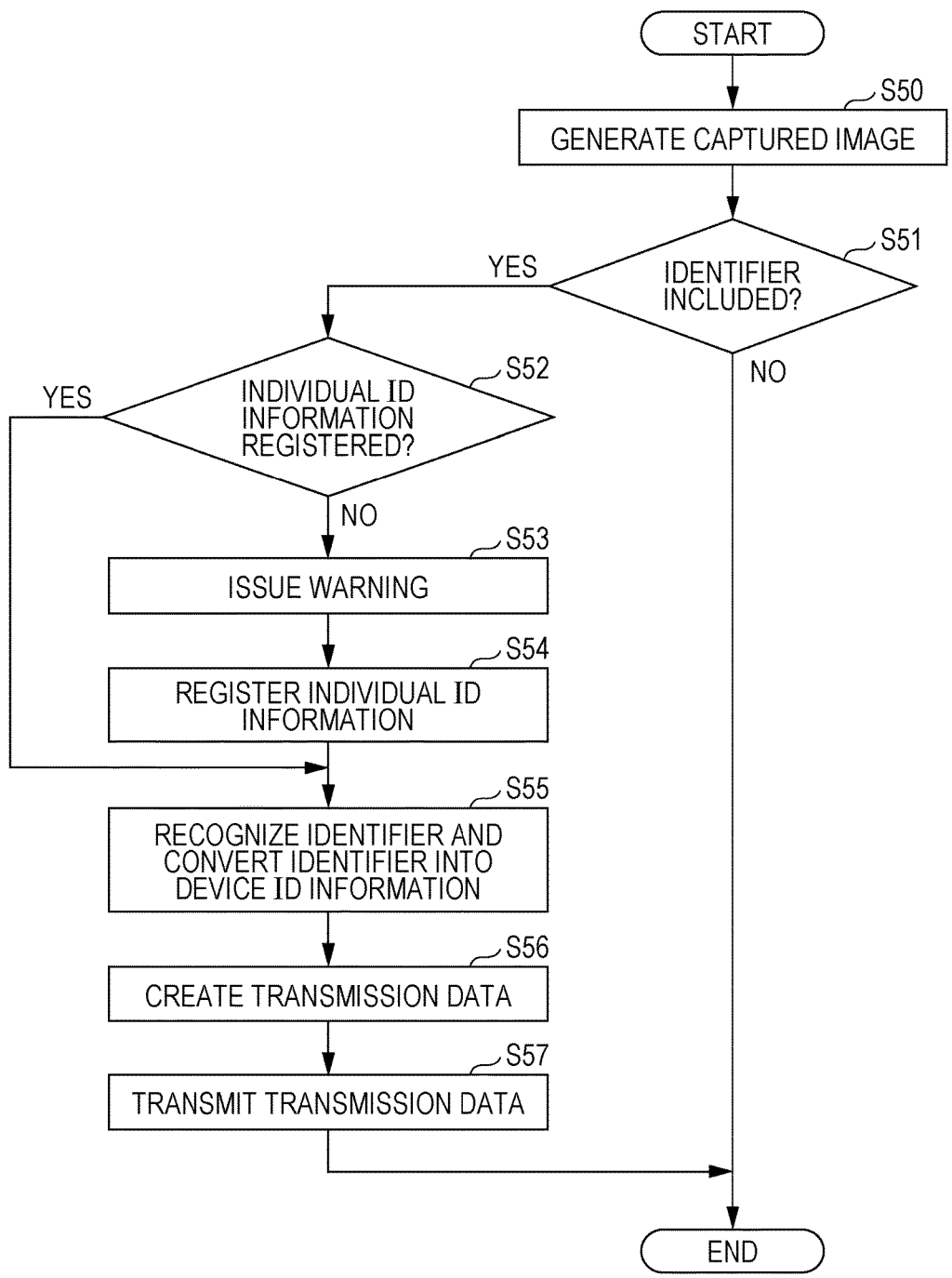
FIG. 16 is a flowchart illustrating an example of processing performed during device inspection by the mobile terminal illustrated in FIG. 15.

The overall processing of the device inspection system according to the present embodiment is similar to that of the device inspection system according to Embodiment 2 except for the processing performed during device inspection by the mobile terminal 500 illustrated in FIG. 13, and therefore detailed description thereof is omitted, and only different processes are described below. FIG. 16 is a flowchart illustrating an example of processing performed during device inspection by the mobile terminal 500a illustrated in FIG. 15.

First, the image input unit 502 of the mobile terminal 500a generates captured image data from an image taken by the imaging unit 501 and supplies the captured image data to the identifier recognition unit 503 (Step S50), as in Embodiment 1. The image input unit 502 regularly generates captured image data at a predetermined frame rate, and the following processes are repeatedly performed on captured image data of respective frames.

Next, the identifier recognition unit 503 determines whether or not the supplied captured image data includes a device identification label 601 that is an identifier (Step S51). A known technique such as the one used to read a QR code may be used for detection of the device identification label 601. In a case where the captured image data of the subject frame does not include the device identification label 601 (NO in Step S51), nothing is done to the captured image data of the subject frame, and the processing ends. In a case where the captured image data of the subject frame includes the device identification label 601 (YES in Step S51), the processing proceeds to Step S52.

Next, the individual ID information obtaining unit 509 determines whether or not individual ID information is registered in the individual ID information storage unit 508 (Step S52). In a case where no individual ID information is registered (NO in Step S52), the processing proceeds to Step S53. In a case where individual ID information is registered (YES in Step S51), the processing proceeds to Step S55.

In a case where no individual ID information is registered (NO in Step S52), the individual ID information obtaining unit 509 instructs the display unit 510 to display a message warning that individual ID information should be registered, and the display unit 510 displays the message warning that individual ID information should be registered (Step S53).

The warning message may be displayed in a case where the display unit 510 is constituted by a display. Alternatively, the warning may be issued by voice in a case where the display unit 510 is constituted by a speaker.

Next, when a worker carrying the mobile terminal 500*a* inputs individual ID information to register the individual ID information, the individual ID information input unit 506 supplies the input individual ID information to the individual ID information registration unit 507, and the individual ID information registration unit 507 causes the individual ID information supplied from the individual ID information input unit 506 to be registered in the individual ID information storage unit 508 (Step S54).

Next, the individual ID information obtaining unit 509 obtains the individual ID information stored in the individual ID information storage unit 508 and supplies the individual ID information to the transmission information generating unit 504, and the identifier recognition unit 503 recognizes the device identification label 601 from the captured image data by using a known technique, converts the device identification label 601 into device ID information, and then supplies the device ID information to the transmission information generating unit 504 (Step S55).

Next, the transmission information generating unit 504 creates transmission data by using the device ID information thus obtained and the individual ID information stored in the individual ID information storage unit 508 (Step S56).

Next, the ID information transmitting unit 505 transmits the created transmission data to the device management apparatus 400 over a network (Step S57).

Upon receipt of the device ID information and the individual ID information by the device management apparatus 400, the worker is given power of editing operation record information and is thus allowed to create an operation record by processes similar to those in Embodiment 2.

As described above, according to the configuration of the device inspection system according to the present embodiment, a worker is allowed to inspect a device to be inspected without false recognition by giving the worker power of editing operation record information by the device management apparatus 400 and the mobile terminal 500*a* that use read device ID information of the device 600 to be inspected and registered individual ID information for identifying the worker and device ID information and individual ID information included in operation instruction information.

Furthermore, the worker needs to go in front of the device 600 to be inspected and use the mobile terminal 500*a* to recognize the device identification label 601 provided on the device 600. This makes it possible to prevent the worker from creating a false operation record without visiting the device 600 to be inspected. Furthermore, it is possible to reduce on-site processing by registering the individual ID information in the mobile terminal 500*a* before inspection of the device 600.

Embodiment 4

Next, a device inspection system according to Embodiment 4 of the present disclosure is described. In the present embodiment, operation instruction information that is transmitted in response to an operation instruction from headquarters includes at least individual ID information of a worker or a group who is scheduled to perform an operation in addition to device ID information of a device, and power of editing operation record information is given by using the individual ID information in addition to the device ID information of the device, as in Embodiment 2. In the present embodiment, however, the device has a device display plate that has an individual authentication function and causes the device display plate to display an identifier corresponding to the individual ID information.

That is, in the present embodiment, an image of the device display plate that is a display unit displaying an individual identification label is taken unlike Embodiment 2 in which individual ID information is determined by using the ID card 700 having the individual identification label 701 corresponding to the individual ID information.

Therefore, the configuration of the device inspection system according to the present embodiment is similar to that of the device inspection system illustrated in FIG. 1 except for that a device has a device display plate, the configuration of a device management apparatus according to the present embodiment is similar to that of the device management apparatus 400 illustrated in FIG. 4, and the configuration of the mobile terminal according to the present embodiment is similar to that of the mobile terminal 500 illustrated in FIG. 5. Illustration and description of parts that are identical to those in Embodiments 1 and 2 are omitted, and differences from Embodiments 1 and 2 are described in detail below.

Figure 17:
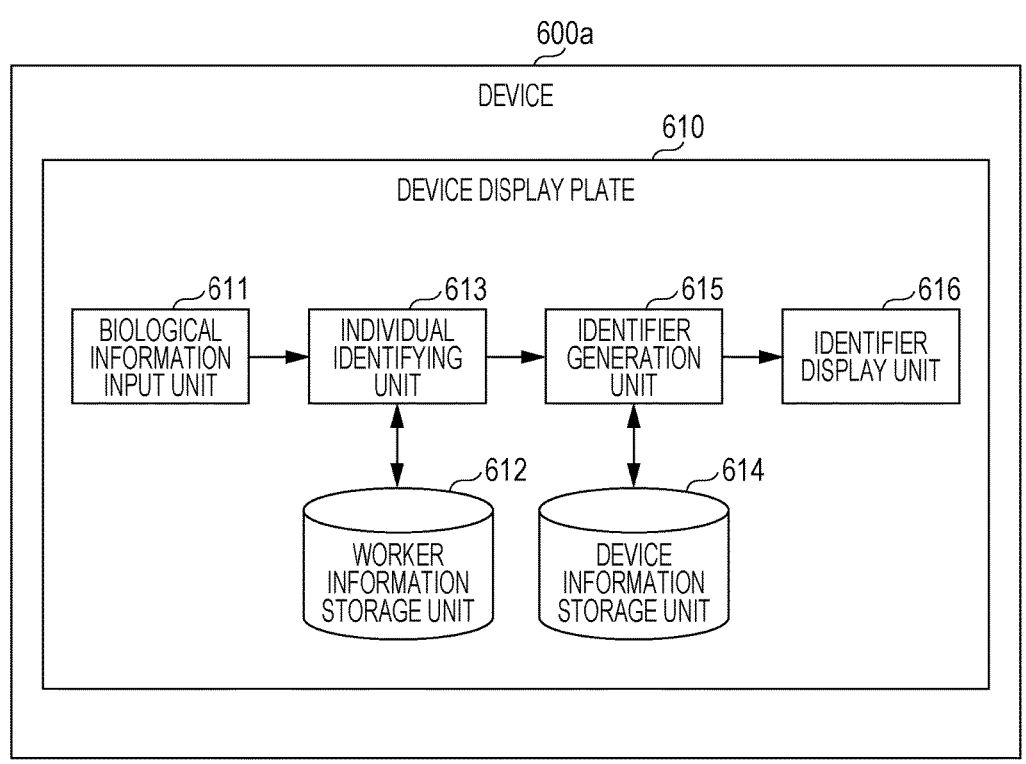
FIG. 17 is a block diagram illustrating an example of a configuration of a device display plate provided on a device of a device inspection system according to Embodiment 4 of the present disclosure.

FIG. 17 is a block diagram illustrating an example of a configuration of the device display plate provided on a device in the device inspection system according to Embodiment 4 of the present disclosure. A device 600*a* illustrated in FIG. 17 includes a device display plate 610, and the device display plate 610 includes a biological information input unit 611, a worker information storage unit 612, an individual identifying unit 613, a device information storage unit 614, an identifier generation unit 615, and an identifier display unit 616.

The device display plate 610 is, for example, provided at a predetermined position on a front face of the device 600*a*. The device display plate 610 generates an individual identification label (e.g., a QR code similar to the individual identification label 701 illustrated in FIG. 12) that is an identifier such as a QR code corresponding to individual ID information of a worker from the biological information of the worker and displays the individual identification label together with a device identification label (e.g., a QR code similar to the device identification label 601 illustrated in FIG. 2) that is an identifier indicative of a device number of the device 600*a*.

As the biological information input unit 611, for example, a camera having a lens and an image sensor is used. The biological information input unit 611 is used, for example, to take an image of a face used for biometric authentication. Specifically, the biological information input unit 611 takes an image of the face of the worker when the worker arrives at an inspection site, converts the taken image into an electric signal, and then supplies image data thus obtained to the individual identifying unit 613. The biometric authentication is not limited to the above example, and other biological information such as a fingerprint or an iris may be used.

As the worker information storage unit 612, for example, a semiconductor memory or a hard disc device is used. Biological information such as information on the face of the worker and individual ID information of the worker are stored in association with each other in the worker information storage unit 612.

As the individual identifying unit 613, for example, a CPU, an MPU, a DSP, an ASIC, or an FPGA is used. The individual identifying unit 613 has a function of extracting biological information from the input image data and comparing the biological information with biological information stored in the worker information storage unit 612. For example, the individual identifying unit 613 detects the face from the image data supplied from the biological information input unit 611, compares the information on the detected face and face information stored in the worker information storage unit 612, and supplies individual ID information corresponding to face information that matches the information on the detected face to the identifier generation unit 615.

As the device information storage unit 614, for example, a semiconductor memory or a hard disc device is used. Device ID information of the device 600a is stored in the device information storage unit 614.

As the identifier generation unit 615, for example, a CPU, an MPU, a DSP, an ASIC, or an FPGA is used. The identifier generation unit 615 reads out the device ID information of the device 600a from the device information storage unit 614, generates an individual identification label and a device identification label that are identifiers from the supplied individual ID information and the read device ID information by using a known technique, and supplies the individual identification label and the device identification label to the identifier display unit 616.

The identifier display unit 616 is, for example, a display device such as an LCD or an organic EL display. For example, the identifier display unit 616 has a function of displaying the individual identification label and the device identification label for only a predetermined period upon receipt of information on the individual identification label and the device identification label that are identifiers from the identifier generation unit 615.

Figure 18:
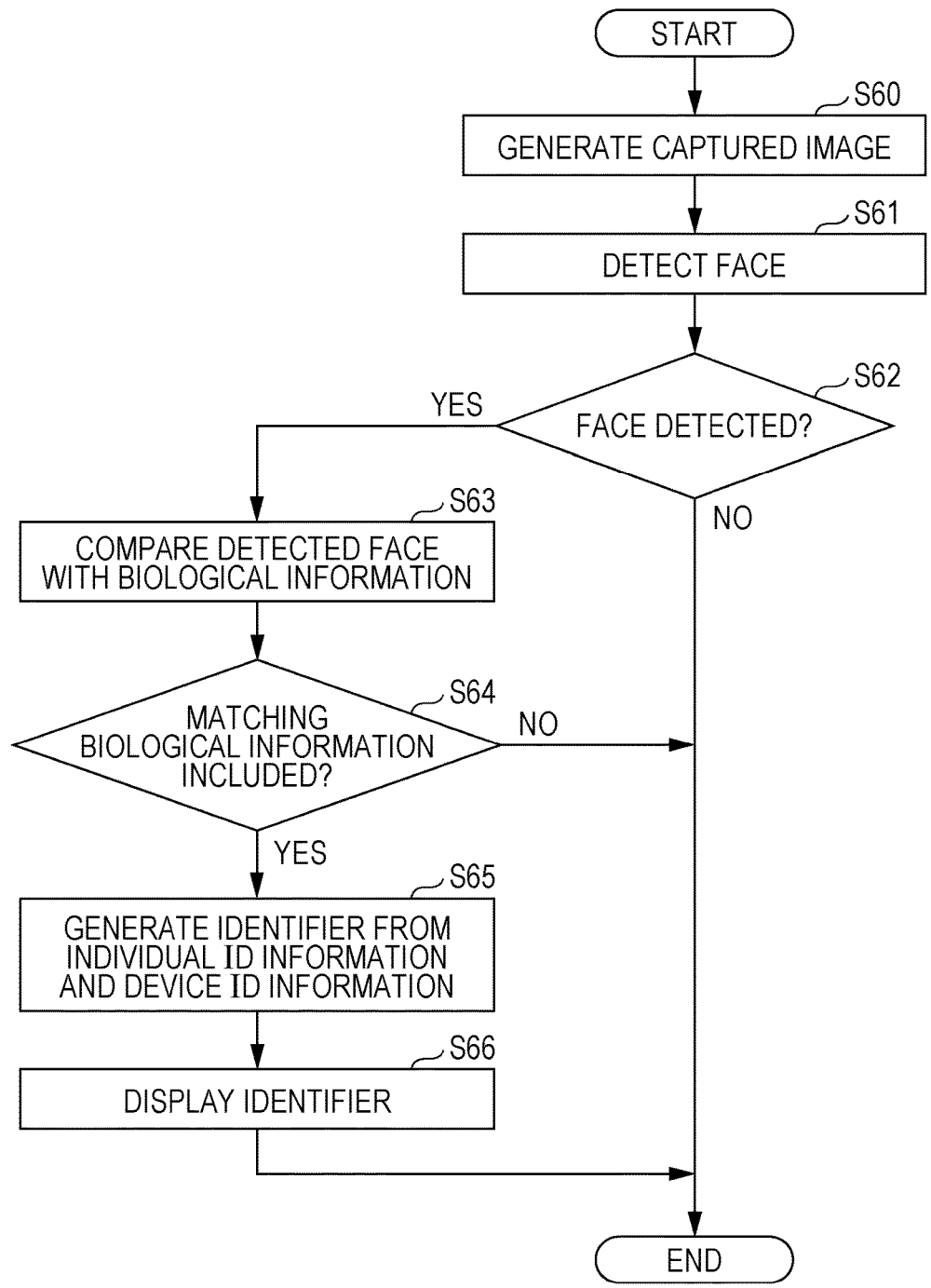
FIG. 18 is a flowchart illustrating an example of processing performed during device inspection by the device display plate illustrated in FIG. 17.

The overall processing of the device inspection system according to the present embodiment is similar to that of the device inspection system according to Embodiment 2 except for that processing performed during device inspection by the device display plate 610 is added, and therefore detailed description thereof is omitted, and only different processes are described below. FIG. 18 is a flowchart illustrating an example of the processing performed during device inspection by the device display plate 610 illustrated in FIG. 17.

First, the biological information input unit 611 of the device display plate 610 takes an image of a face of a worker, generates image data from the taken image, and then supplies the image data to the individual identifying unit 613 (Step S60). The biological information input unit 611 regularly generates image data at a predetermined frame rate, and the following processes are repeated performed on image data of respective frames.

Next, the individual identifying unit 613 detects the face from the supplied image data (Step S61). A known technique is used for detection of the face and comparison of biological information, and therefore description thereof is omitted.

Next, the individual identifying unit 613 determines whether or not the worker's face has been detected by the above face detection process (Step S62). In a case where the face has not been detected (NO in Step S62), the processing for the image data of the subject frame ends. Meanwhile, in a case where the face has been detected (YES in Step S62), the processing proceeds to Step S63.

Next, the individual identifying unit 613 compares the detected face with biological information (face information) of workers registered in the worker information storage unit 612 (Step S63).

Next, the individual identifying unit 613 determines whether or not biological information (face information) that matches the detected face is included in the worker information storage unit 612 (Step S64). In a case where the biological information that matches the detected face is not included (NO in Step S64), the processing for the image data of the subject frame ends. Meanwhile, in a case where the biological information that matches the detected face is included (YES in Step S64), the processing proceeds to Step S65.

Next, the individual identifying unit 613 reads out individual ID information corresponding to the biological information (face information) that matches the detected face from the worker information storage unit 612 and supplies the individual ID information to the identifier generation unit 615, and the identifier generation unit 615 obtains device ID information stored in the device information storage unit 614 and generates an individual identification label and a device identification label that are identifiers such as QR codes from the obtained device ID information and the supplied individual ID information by using a known technique (Step S65).

Next, the identifier display unit 616 displays the generated identifiers, i.e., the individual identification label and the device identification label (Step S66). Then, the process in Step S60 and the subsequent steps are repeated to process image data of a next frame. The above is the description of the processing performed by the device display plate 610.

As described above, according to the configuration of the device inspection system according to the present embodiment, a worker who inspects the device 600a reads a device identification label expressing device ID information and an individual identification label expressing individual ID information that are displayed on the device display plate 610 by using the mobile terminal 500, and the worker is given power of editing operation record information by using the device ID information and individual ID information thus read and device ID information and individual ID information that are included in operation instruction information of the device management apparatus 400. This allows the worker to inspect the device 600a to be inspected without false recognition.

Furthermore, the worker needs to go in front of the device display plate 610 of the device 600a to be inspected and use the mobile terminal 500 to recognize the device identification label and the individual identification label displayed on the device display plate 610. This makes it possible to prevent the worker from creating false operation record information without visiting the device 600a to be inspected.

Furthermore, since individual ID information of the worker is displayed on the device display plate 610 of the device 600a by using biometric authentication, the device 600a can be inspected while omitting the troublesome procedures such as using an ID card and registering individual ID information in a mobile terminal.

In the present embodiment, the mobile terminal 500 takes images of the device identification label and the individual identification label concurrently. Alternatively, it is also possible to employ an arrangement in which images of the device identification label and the individual identification label are separately taken, information on a timing at which the device identification label is read and information on a timing at which the individual identification label is read are transmitted to the device management apparatus 400 in addition to the device ID information and individual ID information, and the images of the device identification label and the individual identification label are considered to have been taken concurrently in a case where an interval between the timing at which the device identification label is read and a timing at which the individual identification label is read is within a predetermined period, as in the modification of Embodiment 2.

Specifically, the operation instruction information further includes individual identification information for identifying a worker who inspects the device 600a, and the device display plate of 610 displays the device identification label of the device 600a and the individual identification label who inspects the device 600a.

The imaging unit 501 and the image input unit 502 of the mobile terminal 500 read the device identification label of the device 600a displayed on the device display plate 610 and supply a timing at which the device identification label is read to the identifier recognition unit 503 together with captured image data generated from the read image. The imaging unit 501 and the image input unit 502 read the individual identification label displayed on the device display plate 610 at a timing different from a timing at which the device identification label is read (before or after the timing at which the device identification label is read) and supply the timing at which the individual identification label is read to the identifier recognition unit 503 together with captured image data generated from the read image. The identifier recognition unit 503 specifies, from the respective captured image data, device identification information corresponding to the read device identification label and individual identification information corresponding to the read individual identification label and supplies the specified device identification information and individual identification information and the timings to the transmission information generating unit 504. The transmission information generating unit 504 creates transmission data including the specified device identification information and individual identification information and the timings and transmits the created transmission data to the device management apparatus 400 by using the ID information transmitting unit 505.

The ID information receiving unit 409 of the device management apparatus 400 receives the transmission data including the device identification information and individual identification information and the timings from the mobile terminal 500 and then supplies the transmission data to the editing power giving unit 410. The editing power giving unit 410 makes operation record information editable in a case where an interval between the timing at which the device identification label is read and a timing at which the individual identification label is read is within a predetermined period, the received device identification information matches device identification information of the device to be inspected included in operation instruction information stored in the management information storage unit 403, and the received individual identification information matches individual identification information of the device to be inspected included in operation instruction information stored in the management information storage unit 403.

In this case, matching of the device identification information of the device 600a to be inspected and matching of the individual identification information of the worker are checked only in a case where an interval between the timing at which the device identification label is read and the timing at which the individual identification label is read is within the predetermined period. This makes it possible to prevent, with certainty, the worker from creating operation record information on the basis of false recognition of a device to be inspected and to prevent, with certainty, the worker from creating false operation record information without visiting the device to be inspected by guaranteeing worker's visit to the device to be inspected even in a case where a plurality of devices 600a are inspected and where the device identification label and the individual identification label are separately read.

In the present embodiment, the device display plate 610 concurrently displays the device identification label and the individual identification label. However, the present embodiment is not limited to this example in particular. Various changes such as providing a device identification label (e.g., the device identification label 601 illustrated in FIG. 2) on the device 600a and displaying only the individual identification label on the device display plate 610 are possible. Also in this case, the device identification label and the individual identification label may be concurrently read or may be separately read.

A device inspection system according to the present disclosure has a function of comparing a device to be inspected and a device indicated by operation instruction information and a function of comparing a worker who inspects the device and a worker responsible indicated by the operation instruction information and makes it possible to prevent erroneous inspection based on false recognition in a case where a plurality of devices (including equipment) placed at a factory, a plant facility, a construction site, or the like are inspected. Therefore, the device inspection system according to the present disclosure is useful as a management apparatus that manages operation record information created at the time of inspection of a plurality of devices.

What is claimed is:

1. A system, comprising:
a mobile terminal; and
a device management apparatus including a memory and first circuitry, the device management apparatus being separate from the mobile terminal,
wherein the mobile terminal obtains, from a first device, first device identification information for identifying the first device, the mobile terminal including a reader that reads, from the first device, a device identification label having an image that expresses the first device identification information and is unique to the first device,
the memory included in the device management apparatus includes operation instruction information including second device identification information for identifying a second device to be inspected and operation record information including a result of inspection of the second device, the operation record information being created at a time of inspection of the second device,
the first circuitry included in the device management apparatus, in operation, performs first operations including making the operation record information stored in the memory editable in a case where the first device identification information obtained from the first device and the second device identification information included in the operation instruction information match,
the mobile terminal includes second circuitry which, in operation, performs second operations including specifying the first device identification information corresponding to the read device identification label,
the mobile terminal includes a transmitter that transmits the specified first device identification information to the device management apparatus,
the device management apparatus includes a receiver that receives the transmitted first device identification information, and
the first operations include making the operation record information stored in the memory editable in a case where the received first device identification information and the second device identification information included in the operation instruction information match.

2. The system according to claim 1, wherein
the reader reads the device identification label and an individual identification label concurrently, the individual identification label being carried by a first worker and having an image that expresses first individual identification information for identifying the first worker and being unique to the first worker,
the operation instruction information further includes second individual identification information for identifying a second worker responsible for inspection of the second device,
the second operations further include specifying the first individual identification information corresponding to the read individual identification label,
the transmitter further transmits the specified first individual identification information to the device management apparatus,
the receiver further receives the transmitted first individual identification information, and
the first operations further include making the operation record information editable in a case where the received first device identification information and the second device identification information included in the operation instruction information match and where the received first individual identification information and the second individual identification information included in the operation instruction information match.

3. The system according to claim 2, wherein
the operation instruction information further includes inspection order information,
a plurality of second devices is inspected in an order indicated by the inspection order information, each of the plurality of second devices being the second device, and
the first operations further include presenting the second device identification information to the mobile terminal in a case where the received first device identification information does not match the second device identification information of the second device to be inspected next according to the order indicated by the inspection order information.

4. The system according to claim 1, wherein
the reader reads the device identification label and an individual identification label separately, the individual identification label being carried by a first worker and having an image that expresses first individual identification information for identifying the first worker and being unique to the first worker,
the operation instruction information further includes second individual identification information for identifying a second worker responsible for inspection of the second device,
the second operations further include specifying the first individual identification information corresponding to the read individual identification label,
the transmitter further transmits the specified first individual identification information to the device management apparatus,
the receiver further receives the transmitted first individual identification information, and
the first operations further include making the operation record information editable in a case where an interval between a timing at which the device identification label is read by the reader and a timing at which the individual identification label is read by the reader is within a predetermined period, the received first device identification information and the second device identification information included in the operation instruction information match, and the received first individual identification information and the second individual identification information included in the operation instruction information match.

5. The system according to claim 1, wherein
the second operations further include registering first individual identification information for identifying a first worker using the mobile terminal,
the operation instruction information further includes second individual identification information for identifying a second worker responsible for inspection of the second device,
the transmitter further transmits the registered first individual identification information to the device management apparatus,
the receiver further receives the transmitted first individual identification information, and
the first operations further include making the operation record information editable in a case where the received first device identification information and the second device identification information included in the operation instruction information match and where the received first individual identification information and the second individual identification information included in the operation instruction information match.

6. The system according to claim 1, wherein
the first device includes a display that displays the device identification label and an individual identification label, the individual identification label having an image that expresses first individual identification information for identifying a first worker and being unique to the first worker,
the reader concurrently reads the device identification label displayed on the display and the individual identification label displayed on the display,
the operation instruction information further includes second individual identification information for identifying a worker responsible for inspection of the second device,
the second operations further include specifying the first individual identification information corresponding to the read individual identification label,
the transmitter further transmits the specified first individual identification information to the device management apparatus,
the receiver further receives the transmitted first individual identification information, and
the first operations further include making the operation record information editable in a case where the received first device identification information and the second device identification information included in the operation instruction information match and where the received first individual identification information and the second individual identification information included in the operation instruction information match.

7. The system according to claim 1, wherein
the first device includes a display that displays the device identification label and an individual identification label, the individual identification label having an image that expresses first individual identification information for identifying a first worker and being unique to the first worker, the reader separately reads the device identification label displayed on the display and the individual identification label displayed on the display, the operation instruction information further includes second individual identification information for identifying a worker responsible for inspection of the second device, the second operations further include specifying the first individual identification information corresponding to the read individual identification label, the transmitter further transmits the specified first individual identification information to the device management apparatus, the receiver further receives the transmitted first individual identification information, and the first operations further include making the operation record information editable in a case where an interval between a timing at which the device identification label is read by the reader and a timing at which the individual identification label is read by the reader is within a predetermined period, the received first device identification information and the second device identification information included in the operation instruction information match, and the received first individual identification information and the second individual identification information included in the operation instruction information match.

8. A method comprising:

obtaining, by a mobile terminal and from a first device, first device identification information for identifying the first device, the mobile terminal including a reader that reads, from the first device, a device identification label having an image that expresses the first device identification information and is unique to the first device;

storing, in a memory included in a device management apparatus, operation instruction information including second device identification information for identifying a second device to be inspected and operation record information including a result of inspection of the second device, the operation record information being created at a time of inspection of the second device;

performing, by first circuitry included in the device management apparatus, first operations including making the operation record information stored in the memory editable in a case where the obtained first device identification information and the second device identification information included in the operation instruction information match;

performing, by second circuitry included in the mobile terminal, second operations including specifying the first device identification information corresponding to the read device identification label;

transmitting, by a transmitter included in the mobile terminal, the specified first device identification information to the device management apparatus; and receiving, by a receiver included in the device management apparatus, the transmitted first device identification information, wherein the first operations include making the operation record information stored in the memory editable in a case where the received first device identification information and the second device identification information included in the operation instruction information match.

9. A non-transitory computer-readable recording medium storing a program which, when executed by a system, causes the system to perform processes including:

obtaining, by a mobile terminal and from a first device, first device identification information for identifying the first device, the mobile terminal including a reader that reads, from the first device, a device identification label having an image that expresses the first device identification information and is unique to the first device;

storing, in a memory included in a device management apparatus, operation instruction information including second device identification information for identifying a second device to be inspected and operation record information including a result of inspection of the second device, the operation record information being created at a time of inspection of the second device;

performing, by first circuitry included in the device management apparatus, first operations including making the operation record information stored in the memory editable in a case where the obtained first device identification information and the second device identification information included in the operation instruction information match;

performing, by second circuitry included in the mobile terminal, second operations including specifying the first device identification information corresponding to the read device identification label;

transmitting, by a transmitter included in the mobile terminal, the specified first device identification information to the device management apparatus; and receiving, by a receiver included in the device management apparatus, the transmitted first device identification information, wherein the first operations include making the operation record information stored in the memory editable in a case where the received first device identification information and the second device identification information included in the operation instruction information match.

* * * * *